US007192628B2

(12) United States Patent
Burrows

(10) Patent No.: US 7,192,628 B2
(45) Date of Patent: Mar. 20, 2007

(54) MAGNETICALLY INTERACTIVE SUBSTRATES

(75) Inventor: Roger I. Burrows, Wilton, CT (US)

(73) Assignee: Sandvik Innovations LLC, Wayne, PA (US)

(*) Notice: Subject to any disclaimer, the term of this patent is extended or adjusted under 35 U.S.C. 154(b) by 0 days.

(21) Appl. No.: 10/428,057

(22) Filed: May 1, 2003

(65) Prior Publication Data

US 2004/0241394 A1 Dec. 2, 2004

(51) Int. Cl.
*B29L 35/08* (2006.01)

(52) U.S. Cl. ...................... 427/598; 446/135; 446/136; 273/239; 427/458; 235/449; 235/493; 428/195.1

(58) Field of Classification Search ................ 428/354, 428/40, 328, 343, 208, 206, 195.1; 235/449, 235/493; 434/168, 178; 446/135, 136; 283/82; 273/239; 427/458
See application file for complete search history.

(56) References Cited

U.S. PATENT DOCUMENTS

| | | | | |
|---|---|---|---|---|
| 1,531,070 | A | 3/1925 | Bruns | |
| 2,864,275 | A | 12/1958 | Fraleigh | 88/471 |
| 3,093,919 | A | 6/1963 | Holtz | 40/142 |
| 3,096,206 | A | 7/1963 | Wade, Jr. | 117/121 |
| 3,308,462 | A | 3/1967 | Gluck | 343/18 |
| 3,406,974 | A | 10/1968 | Nelson | 273/134 |
| 3,464,134 | A | 9/1969 | Franklin | 40/142 |
| 3,496,653 | A | 2/1970 | Wolfner et al. | 35/73 |
| 3,662,477 | A | 5/1972 | Weinstein | 434/330 |
| 3,716,935 | A | 2/1973 | Friederichs | 40/142 |
| 3,726,026 | A | 4/1973 | Borcherding | 35/62 |
| 3,758,693 | A | 9/1973 | Ebert | 434/261 |
| 3,769,720 | A | 11/1973 | Terrones | 35/7 |
| 3,927,930 | A | 12/1975 | Goldberg et al. | 350/151 |
| 3,928,921 | A | 12/1975 | Gurman | 35/7 |
| 3,994,079 | A | 11/1976 | Mirman | 35/53 |
| 4,025,379 | A | 5/1977 | Whetstone | 156/306 |
| 4,032,674 | A | 6/1977 | Hirabayashi et al. | 427/130 |
| 4,306,869 | A | 12/1981 | Oettinger et al. | 434/305 |
| 4,549,532 | A | 10/1985 | Baermann | 128/1.3 |
| 4,584,223 | A | 4/1986 | Krapf | 428/58 |
| 4,604,065 | A | 8/1986 | Frazer et al. | 434/331 |
| 4,676,753 | A | 6/1987 | Haggas | 434/155 |
| 4,702,700 | A | 10/1987 | Taylor | 434/168 |
| 4,832,605 | A | 5/1989 | Bragin | 434/168 |
| 4,876,140 | A | 10/1989 | Quackenbush | 428/216 |
| 4,908,164 | A | 3/1990 | Brussino | 264/22 |
| 4,952,153 | A | 8/1990 | McAllister | 434/259 |
| 4,960,651 | A | 10/1990 | Pettigrew et al. | 428/607 |
| 4,990,117 | A | 2/1991 | Yonezawa | 446/136 |
| 5,005,841 | A | 4/1991 | Klick | 273/345 |
| 5,006,000 | A | 4/1991 | House | 434/161 |
| 5,041,331 | A | 8/1991 | Glavin et al. | 428/220 |

(Continued)

FOREIGN PATENT DOCUMENTS

| | | |
|---|---|---|
| WO | WO 01/23058 | 5/2001 |

*Primary Examiner*—Merrick Dixon
(74) *Attorney, Agent, or Firm*—Drinker Biddle & Reath LLP

(57) ABSTRACT

A substrate is printed with areas of magnetizable ink. The magnetizable ink is compressed into the surface of the substrate, and overprinted to hide it. Suitable inks for the purpose are disclosed. The ink may be permanently magnetized in any of a variety of patterns.

36 Claims, 13 Drawing Sheets

U.S. PATENT DOCUMENTS

| | | | | |
|---|---|---|---|---|
| 5,079,058 | A | 1/1992 | Tomiyama et al. | 428/40 |
| 5,178,573 | A | 1/1993 | Smith | 446/73 |
| 5,203,847 | A | 4/1993 | Butt | 273/157 |
| 5,419,706 | A | 5/1995 | Levy | 434/409 |
| 5,447,439 | A | 9/1995 | Nathanson | 434/346 |
| 5,452,508 | A | 9/1995 | Wu | 29/428 |
| 5,609,788 | A | 3/1997 | Deetz | 252/62.54 |
| 5,666,712 | A | 9/1997 | Cvetkov | 29/458 |
| 5,820,383 | A | 10/1998 | Levins | 434/238 |
| 5,868,599 | A | 2/1999 | Kaufman | 446/148 |
| 5,949,050 | A * | 9/1999 | Fosbenner et al. | 235/449 |
| 6,127,034 | A | 10/2000 | Chorley | 428/375 |
| 6,217,405 | B1 * | 4/2001 | Burrows | 446/135 |
| 6,262,115 | B1 * | 7/2001 | Guittard et al. | 514/534 |
| 6,547,626 | B1 * | 4/2003 | Burrows | 446/135 |

* cited by examiner

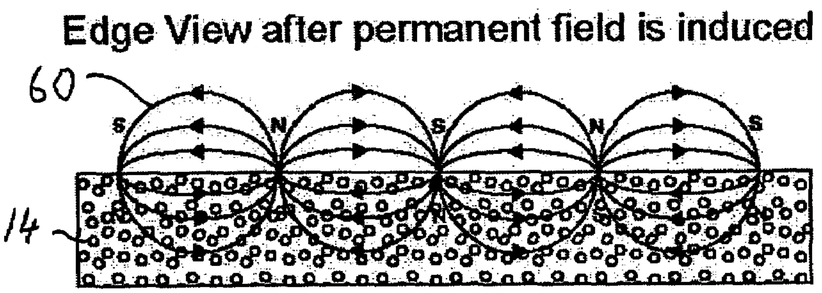
Fig. 11
Fig. 12
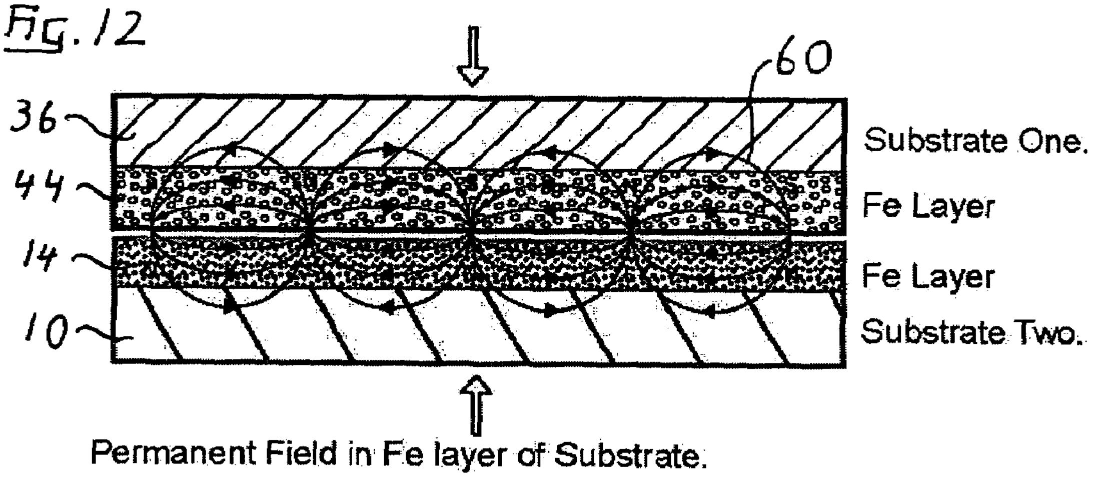

Field induced without plate.

Field induced with plate.

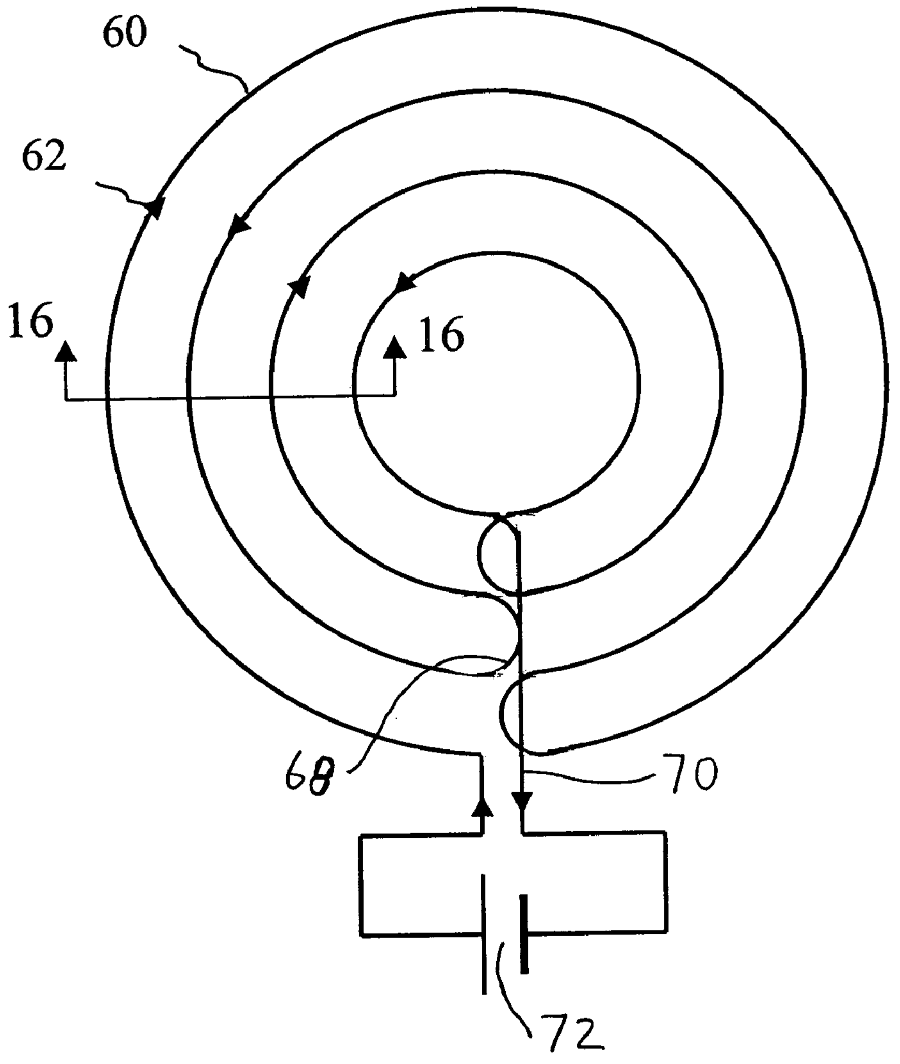
Fig. 15
Fig. 16
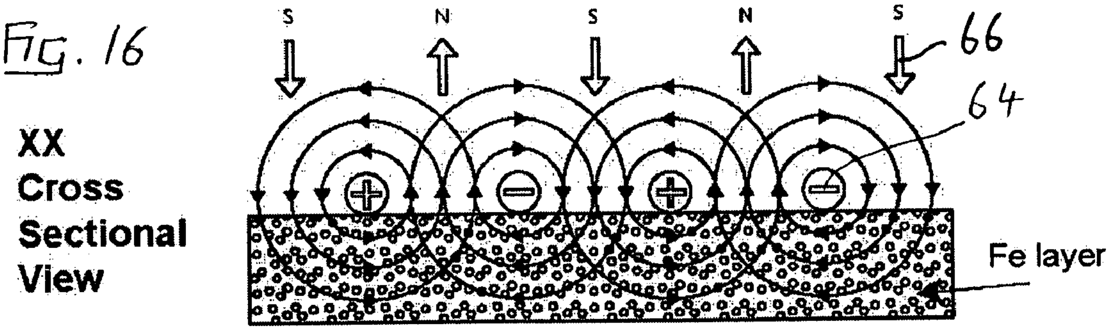

Fig 17: Coil sample for simple code.
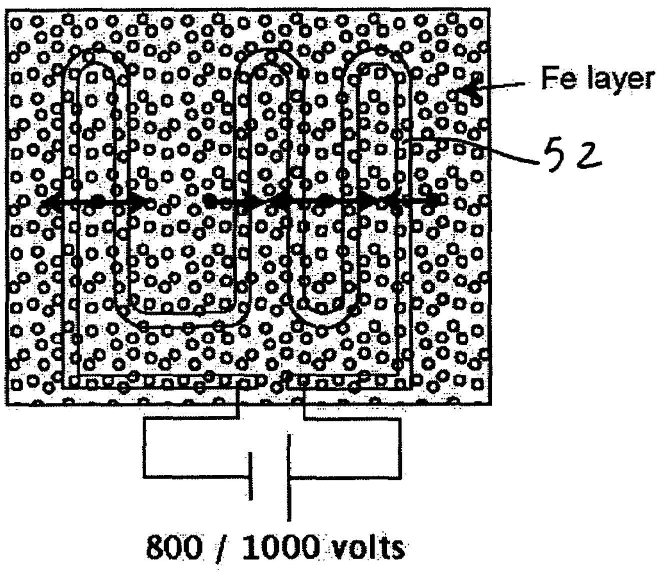
Fig 18: Simple coil configuration to direct a vehicle:
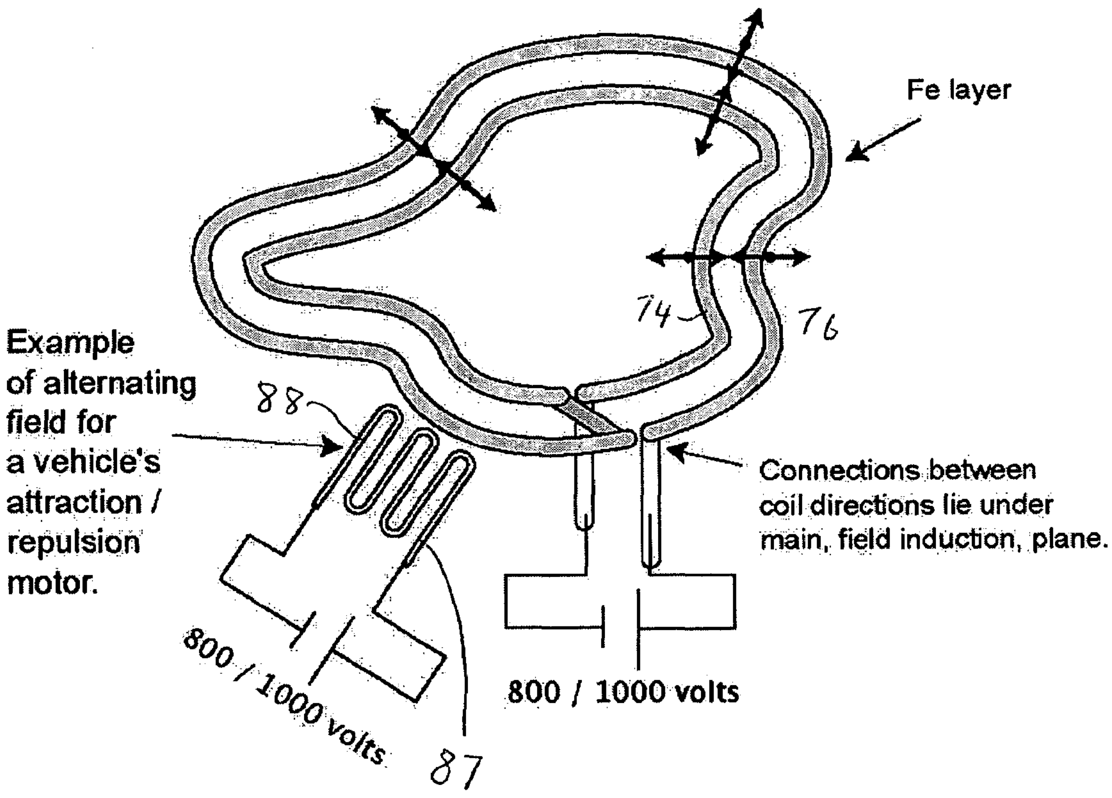

MAGNETICALLY INTERACTIVE SUBSTRATES

FIELD OF THE INVENTION

The present invention relates generally to the field of magnetism, and more particularly to printed or printable sheets incorporating areas of magnetized or magnetizable material that can interact with a removable magnetized or magnetizable play piece. In particular, the present invention relates to an interactive substrate for a book having magnetized or magnetizable areas printed thereon.

BACKGROUND OF THE INVENTION

It is generally known that material having magnetic properties may be incorporated into a variety of applications. For instance, manufacturers have incorporated magnetic material into educational, instructional and interactive devices for children. Magnets and devices having magnetic properties have a special appeal to children due to the invisible properties of magnetism. There are numerous types of interactive toys, games, appliances and displays in which material having magnetic properties is advantageously used to encourage children to learn and practice basic skills such as reading and arithmetic.

One method of incorporating the invisible properties of magnetism into a product involves adding ferromagnetic material such as iron particles into conventional paints or coatings. The iron particles are blended or mixed into the paint to form magnetic paint. The magnetic paint is then conventionally applied to the surface of a substrate, such as wall board, wood, sheet rock, plywood and the like to make signs and other types of displays having a magnet attracting surface. After the magnetic paint dries, the substrate is then cut into abstract shapes and sizes using conventional tooling.

One of the disadvantages of using the magnetic paint described above is the inability to create detailed images and designs out of the paint. That is, the magnetic paint is generally not adapted to be painted in specific locations or to form very meticulous or complex designs. Rather, the magnetic paint is designed to be applied in large areas simply to create a metallic or magnetic surface. Furthermore, the magnetic surface that is created is generally magnetized over the entire surface, rather than magnetized in specific locations. As a result, many educational and instructional displays used for children that utilize magnetic paint are limited to very basic designs and applications.

U.S. Pat. No. 4,702,700 (Taylor) proposes a book with sheets of magnetic material embedded within the pages, which attract removable magnetic pieces placed onto the surface of the page. Although the sheets do not cover the entire area of the page, they are relatively large, and are not shaped into images or designs. Taylor's magnetic sheets are also sufficiently thick that they will produce a significant bulge in the pages. The bulge is esthetically unattractive, and spoils the invisible effect of the magnetism by making it obvious that there is a concealed artifice within the pages. It is believed that the weight of the magnetic sheets used by Taylor would also be such as to restrict the number and size of the sheets that could practically be included in one book.

U.S. Pat. No. 5,949,050 (Fosbenner et al.) proposes magnetic cards containing, sandwiched within them, a shaped sheet of magnetic material that produces an image by attracting magnetic particles in a liquid imaging cell. The shaped sheets of magnetic material are set into correspondingly shaped cutouts in a filler sheet in the cards. Fosbenner suggests that "a magnetic or magnetizable ink" could be used instead of magnetic sheets, but provides little or no disclosure of how to formulate or apply such a magnetic ink. Because of the use of filler sheets, Fosbenner's cards are thick. The filler sheets also add to the weight. Fosbenner's structure would not be suitable for use as the pages of a book, or as a wall poster or the like.

It is generally known that detailed designs and graphic images may be achieved through the use of a variety of conventional printing processes or techniques. Conventional printing techniques such as silk-screening, lithography, rotogravure, flexography, and the like are used to produce very meticulous designs and images on a substrate. However, most metallic or magnetic paints are not usable with the foregoing printing techniques. As a result, most interactive substrates, particularly those used for educational or instructional products marketed for children, lack any type of detailed designs and graphic images having magnetic properties.

SUMMARY OF THE INVENTION

Accordingly, it is desired to provide a printable sheet or other substrate, and a method of making such a substrate, having detailed designs and graphic images that incorporate the invisible properties of magnetism. It is also desired to provide a magnetically interactive substrate for books and other educational or instructional products marketed for children that utilizes detailed designs and graphic images having magnetic properties. It is further desired to provide shaped magnetized or magnetizable areas that are not readily apparent to the ordinary user of the book or other substrate, and in particular that do not have a weight and bulk substantially greater than ordinary sheets of the substrate material. It is desired to provide magnetizable substrates that do not require a thick structure with thick, heavy magnetic pieces, and compensating guards or fillers, shaped to match the magnetic shapes, to offset the thickness of the layer of magnetic material.

In one aspect of the invention, a substrate has a magnetizable area applied thereon using a magnetizable ink. When applied, the ink lies slightly proud of the surface of the substrate. Once the ink has dried sufficiently, pressure is applied to compress the ink and/or indent the ink into the substrate, forming a whole that is substantially flat. Perfect flatness is neither necessary nor, in most cases, achievable. However, it is desirable for the ink layer not to be noticeable to the user. In particular, it is desirable for the edges of the area of magnetizable ink to be nearly enough flush that there is no step noticeable to the user.

The magnetizable ink includes magnetizable particles, such as iron, iron alloys or other material having strong ferromagnetic properties. An especially preferred material is iron ferrite, that is to say, ferromagnetic elemental iron substantially free from non-ferromagnetic iron oxides. The magnetizable particles should be sized and shaped to be compatible with the type of ink and/or the particular printing process ultimately selected. Accordingly, the size and shape of the magnetizable particles may be selected to be compatible with a particular type of ink, the viscosity of the ink, and the type of printing process or other means used for applying the ink to the substrate. As one example of this type of selection, if silk screening is preselected, ferromagnetic particles may be chosen provided that they are small enough to fit through the orifices of the screen mesh during printing.

Magnetizable particles in the range of about 60 μm or smaller have been useful in silk screening. By comparison, magnetizable particles in the range of about 30 μm or smaller have been useful in offset printing. The maximum size of the magnetizable particles may depend on the thickness of the ink layer. As noted below, even smaller particle sizes are possible with some materials.

In another aspect of the invention, one or more areas of magnetic ink preferably comprising, when dry, at least 90% ferrite, and in a practical embodiment from 75% to 93% ferrite are applied to a substrate. Where the ink is to be permanently magnetized, preferred materials are compound ferrites such as $SrFe_{12}O_{19}$, $BaFe_{12}O_{19}$, and NdFeB. Where the ink is not to be permanently magnetized, magnetizable iron, preferably in the form of iron ferrite, is preferred. The compound ferrites support stronger magnetic fields, but are more expensive. It is therefore preferred, for many practical purposes, to use together a permanently magnetized compound ferrite layer and a magnetizable but not permanently magnetized iron ferrite layer that is temporarily magnetized by the field from the compound ferrite layer when they are brought together. A preferred, commercially-available grade of $SrFe_{12}O_{19}$ has a nominal particle size of 2 μm±0.5 μm.

In another aspect of the invention, a magnetizable ink comprises ferromagnetic particles in a plastic matrix. The magnetic particles are preferably encapsulated in a matrix of liquid laminate PVC or low molecular weight styrene-butadiene copolymer (SBC). A solvent such as kerosene or mineral spirits may be added to render the SBC sufficiently fluid for printing.

In another aspect of the invention, a vehicle for travel on a magnetic path comprises support elements for contacting a substrate, which support elements are permanently magnetized with swathes of magnetic polarity parallel to a usual direction of motion of the vehicle. The support elements are preferably wheels, with the swathes of polarity running round the circumference of the wheels.

In a further aspect of the invention, a magnetically interactive device comprises first and second substrates, a magnetizable ink layer applied to at least one selected area of the first substrate, and another magnetizable layer applied to at least one selected area of the second substrate, and the magnetizable ink layer is magnetized generally perpendicularly to that layer in swathes of alternating polarity with a pole pitch in the range of from 0.5 mm to 5 mm, whereby the first and second substrates may interact by magnetic interaction of the magnetic ink layer and the other magnetic layer One or more removable play pieces may be provided having magnetic material for interacting by magnetic attraction with the magnetizable area or areas of a play surface formed by the substrate. The play pieces may be printed with magnetizable ink in accordance with the invention. Each play piece then constitutes a substrate with a magnetizable layer in accordance with the invention. If the play pieces are not printed with magnetizable ink, then they may be coated with magnetizable material in some other form, for example, a suspension of magnetic powder in rubber or plastic. This is appropriate in particular if the entire surface of the play piece is to be covered with magnetic material, so that the extra control of the areas to which the ink is applied by a printing process is not required. If a layer of magnetic material in a form other than ink is used, it is preferably still a thin layer with a very high concentration of magnetic material.

Alternatively, the magnetic ink layer according to the invention may be applied to the play pieces, and some other form of magnetic layer may be applied to the page or other sheet to which the play pieces are to be attached.

The substrate may be of paper, card, or plastic, or any other suitable material, but is preferably heavy paper or thin cardstock. Formulations with SBC as a matrix can be printed on thinner paper, plastic film foil of the type used for foil printing, fabric, and even ceramics and hard plastics.

The art of printing includes both off-contact printing and contact printing techniques. Off-contact printing includes techniques such as silk screening, which uses a screen mesh having a particular image. The screen mesh includes a plurality of holes or orifices through which ink is forced or squeezed through under pressure and deposited onto the substrate. The clarity and type of details that can be formed on the substrate will depend upon the type of screen mesh used (such as fabric, nylon or metal), the size of the orifices, and the tension of the screen. Another form of off-contact printing is spraying in which ink is forced under pressure through an orifice to form an image on the substrate. Contact printing includes techniques such as off-set printing, lithography, flexography, rotogravure, stamping, impression printing and the like, in which the ink is applied to a plate, a rotating drum or cylinder or other surface to transfer an image onto the substrate.

Silk-screen and offset lithography are the techniques at present preferred, but it is contemplated that the present invention may be used with any form of printing process that is capable of applying a suitable layer of magnetizable material on a substrate. It is also contemplated that a transfer process may be used. In that process, the magnetizable ink would be printed onto a resistant medium, and then transferred from the resistant medium to the substrate by placing them in contact and applying pressure.

In a preferred embodiment, the interactive substrate is in the form of a book. The pages of the book form play surfaces with magnetizable areas. The removable play piece is shaped and sized to correspond to the magnetizable area. The magnetizable area can be permanently magnetized to have a predetermined direction of polarization. The removable play piece can also be magnetized, and the relative polarizations of the magnetizable area and the play piece can be opposite to each other so that the play piece can be positioned on the substrate in only one manner.

It is possible in accordance with the present invention to provide a means to print magnetizable Fe inks on a first substrate and a means to permanently magnetize the printed magnetizable Fe inks on the first substrate. It is also possible to provide means to magnetize a second magnetizable substrate so that first or second substrate will support the weight of the other. The second magnetizable substrate may be permanently magnetized, or may be temporarily magnetized by the action of the magnetic field of the first magnetizable substrate. It is also possible to provide means to permanently magnetize the first or second magnetizable substrate, or both, to encode, or direct the other, or trigger magnetic interaction.

BRIEF DESCRIPTION OF THE DRAWINGS

For the purpose of illustrating the invention, there are shown in the drawings forms that are presently preferred; it being understood, however, that this invention is not limited to the precise arrangements and instrumentalities shown.

FIG. 11 is a diagram of the permanent magnetic field induced in a layer of magnetizable ink by the device of FIGS. 9 and 10.

FIG. 12 is a diagram similar to FIG. 11, showing the interaction between the permanent magnetic field and a layer of magnetizable ink that is not permanently magnetized.

FIG. 15 is a diagrammatic plan view of an alternative form of magnetizing device.

FIG. 16 is a cross-section on the line 16—16 in FIG. 15.

FIG. 17 is a diagrammatic plan view of a further form of magnetizing device.

FIG. 18 is a diagram of a still further form of magnetizing device.

DETAILED DESCRIPTION OF THE INVENTION

Figure 1:
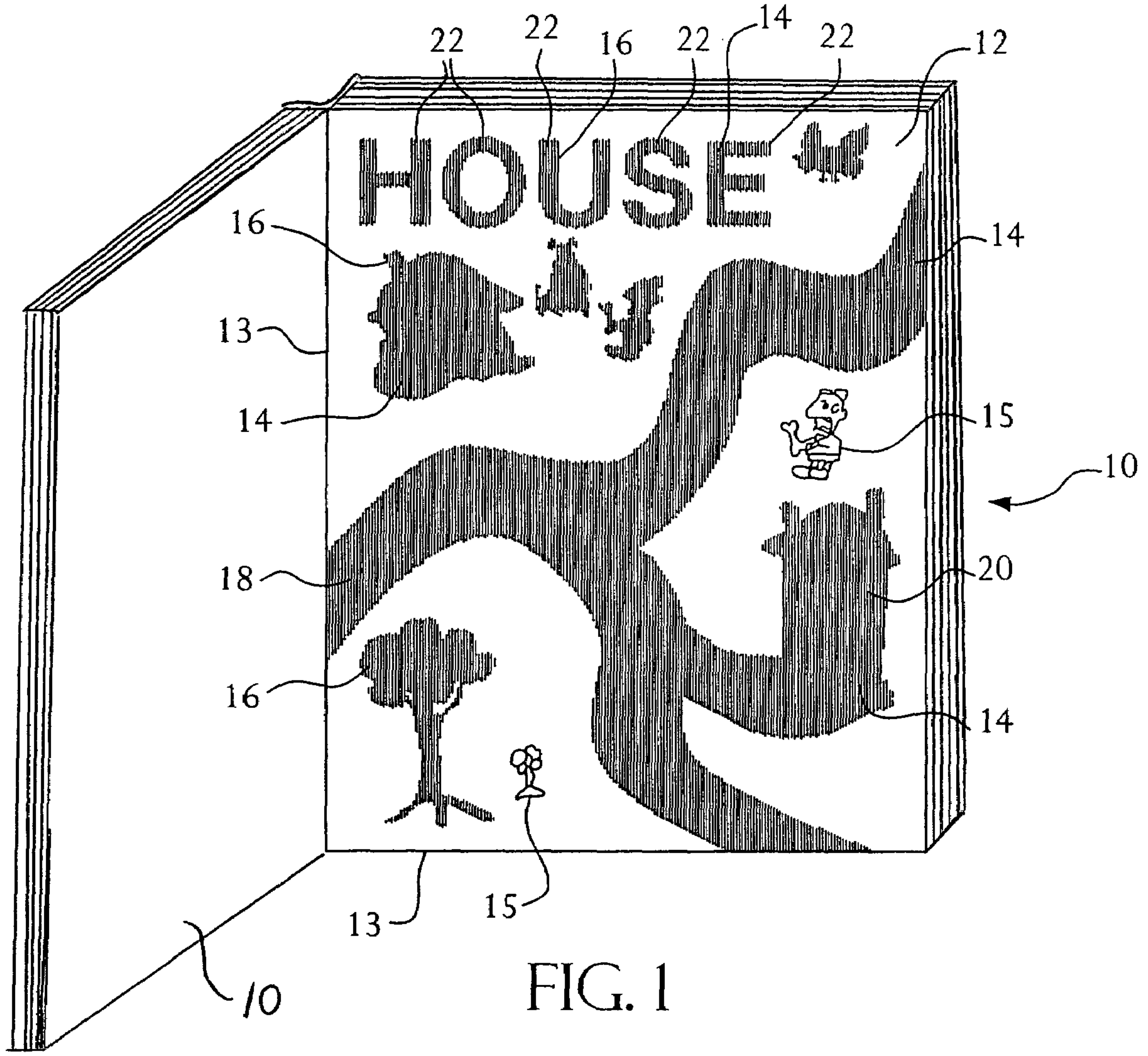
FIG. 1 is an oblique view of a book incorporating as pages a preferred embodiment of magnetizable areas printed on a substrate.

Referring to the drawings, where like numerals indicate like elements, there are shown various embodiments of a magnetically interactive substrate as contemplated by the present invention. Referring initially to FIG. 1, a first form of the substrate is in the form of a sheet or a layer of supporting material indicated generally by the reference numeral 10. The substrate 10 may be made from paper or paper-like substances, including card stock or the like. Coated gray-back card, 180 g/m$^2$ art paper, 230 or 250 gsm card coated for printing on one side (C1S) approximately 320 μm thick, and PVC sheets of 80 Durometer or lower have all been found to be usable. The substrate 10 is of a material that, under sufficient pressure, will compress with little or no resilience. A hydraulic compressor may be used. It has been found that most grades of ordinary card stock or very thick paper are satisfactory.

Multiple substrates may be used with the present invention in any form. The substrate 10 may be used as part of a poster, a calendar, a gift card, or as wall paper, packaging, gift boxes, displays, signage or the like, as a few examples. In the preferred embodiment shown in FIG. 1, multiple substrates 10 are bound together along a common edge to form a volume for a book 11.

The substrate 10 includes a first or front image surface 12, a second surface (not shown) and a circumferential edge 13. At least one magnetizable portion or area 14 is applied to the first surface 12 of the substrate 10. However, in the embodiment shown in FIG. 1, a plurality of magnetizable areas or portions 14 are applied. The magnetizable areas 14 include graphic images and detailed designs having well defined borders or edges 16, such as the road 18, the house 20, and the letters “H” “O” “U” “S” and “E” 22 depicted in FIG. 1.

The magnetizable areas 14 may be applied anywhere on the substrate 10 so desired. The magnetizable areas 14 may be applied to the first surface 12 as shown in FIG. 1 or to both the first surface 12 and the second surface. Alternatively, as described below with reference to FIG. 4, the substrate 10 may be a laminate of two thicknesses of cardstock, and the magnetizable areas may be applied to the reverse side of one thickness of cardstock and covered over by the reverse side of the other thickness of cardstock. As illustrated in FIG. 1, the magnetizable areas 14 may be positioned inwardly of the edge 13 of the substrate 10 or may be allowed to “bleed” over the edges as in the case of the road 18. Although the magnetizable areas 14 are shown in FIG. 1 only on one side of one leaf of the book 11, they may be applied to one or both sides of any or all of the leaves.

The magnetizable areas 14 are made from a magnetizable ink, the formulation and application of which will be discussed below. The magnetizable ink includes magnetizable particles, such as ferrite, iron, iron alloys or other material having strong ferromagnetic properties. As will be explained below, the magnetizable ink preferably contains a high proportion of magnetizable iron in the form of iron ferrite, or of a more sophisticated compound ferromagnetic material. Compound ferrites such as $SrFe_{12}O_{19}$, $BaFe_{12}O_{19}$, and NdFeB are preferred where the magnetizable ink layer is to be permanently magnetized. Where the magnetizable ink layer is not to be permanently magnetized, but is to respond to a nearby magnetized layer, it has been found that iron in the form of ferrite has sufficiently strong magnetic properties, and it is available economically in bulk. It is therefore preferred for this use.

After the magnetizable areas 14 are printed on the substrate 10, they are preferably overprinted, laminated, or otherwise coated. Overprinting can be advantageously used to conceal or visually disguise the presence of the magnetizable areas 14 printed on the substrate. For instance, the magnetizable areas 14 can be overprinted with a white coating of opaque ink or other material to visually conceal their presence on the substrate 10. This coating may consist of more than one layer of ink. Thereafter, the substrate 10 having the white coating material may be overprinted with other graphic images and pictorial designs 15, such as a full color printed scene or characters, using a four-color process or other techniques. Especially if the cardstock 10 is not white, the white coating may be eliminated or replaced with a coating that is similar to the color of the cardstock.

Alternatively, the entire face of the cardstock 10 may be coated with a white or other colored coating to provide a uniform background for visible printing. Suitable coatings include glue board, 250 gsm CCNB recylcled board, 230 gsm C1S board, 128 gsm paper, and stamped plastic foils, including holographically stamped foils. Coatings that are not self-adhesive, such as paper, may be glued on over the magnetizable ink. One suitable form of glue board is Laminator 3046A, supplied by National Starch and Chemical (GC) Ltd., which is a non-flammable, water soluble, dry polymer adhesive and board.

Returning to FIG. 1, the magnetizable areas 14 are overprinted with graphic indicia 15. Any type of graphic indicia 15 may be used in keeping with the scope of the present invention. The graphic indicia 15 can include any type of illustration, pictorial design, texture, colors, text, and the like. In the preferred embodiment, the graphic indicia 15 will visually disguise the presence of the magnetizable areas 14. The graphic indicia 15 may completely conceal the magnetizable areas 14, or may show the outlines of the magnetizable areas while concealing their magnetic nature, or may be thematically related to the respective magnetizable areas 14 on which they are applied without showing their exact outlines.

For example, gray ink may be printed on the road 18 shown on the substrate 10 to show the line of the road while concealing the presence of the magnetizable material 14. The house 20 can be overprinted with graphic indicia 15 to conceal the magnetizable area 14 of the house on the substrate 10, while either marking or concealing the presence of the magnetizable area. The area around the tree 16 might be overprinted with images 15 of trees that complement, but none of which actually coincides with, the magnetic tree 16. In the interests of clarity, only a few graphic indicia 15 have been shown in FIG. 1.

Figure 2:
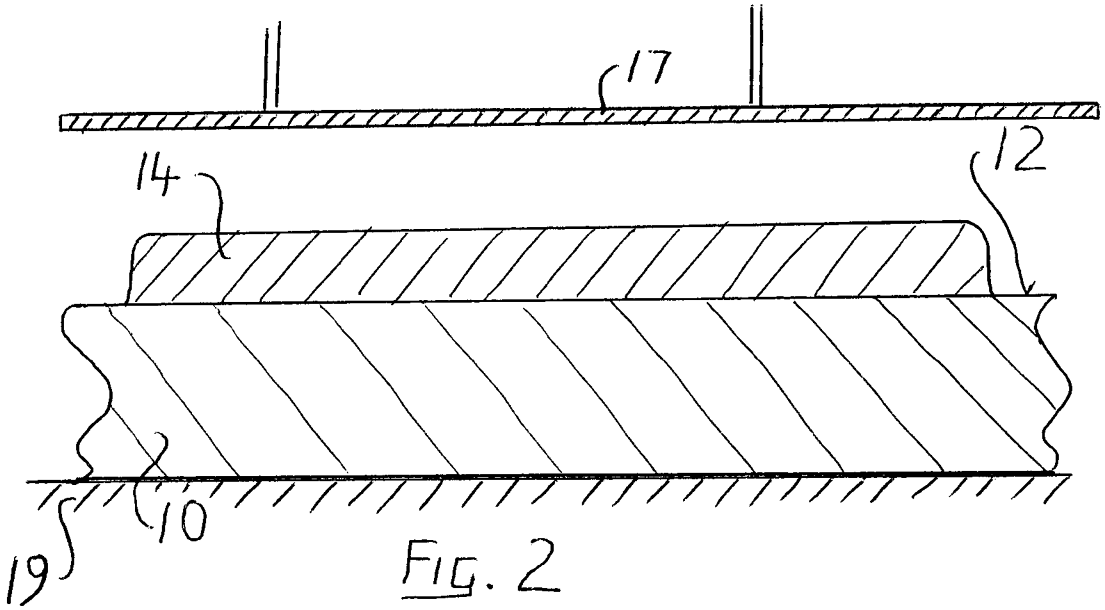
FIG. 2 is a fragmentary section through part of a substrate constituting a page of the book seen in FIG. 1, immediately after application of the magnetizable ink to the substrate.

Referring now to FIG. 2, a layer of magnetic ink 14 is applied to a substrate 10 by any expedient means, for example, by a conventional offset or silk screen printing process, that is suitable for the particular ink. In order to apply a sufficient quantity of magnetic material per unit area for most of the purposes described below, the ink layer is comparatively thick. As shown in FIG. 2, the ink layer is approximately 200 μm thick, and the cardstock substrate 10 is approximately 500 μm thick. This results in a projection of the ink 14 above the surface of the cardstock 10 that would be noticeable to the reader, would be esthetically unappealing, would be vulnerable to damage, and would hinder subsequent printing processes.

There are, of course, purposes for which an ink layer thinner than 200 μm is sufficient. A thickness of 80 to 100 μm is usually the minimum to provide a sufficient quantity of magnetizable material, and thus a sufficient magnetic field strength, to support the weight of a play piece. Where a magnetic field is intended to be detected by a sensor, rather than to support a load, lower fields and proportionally thinner layers of ink can be used. Such magnetic fields may be encoded by the strength, direction, and/or pattern of the magnetic field formed by the same techniques that are described below.

Figure 3:
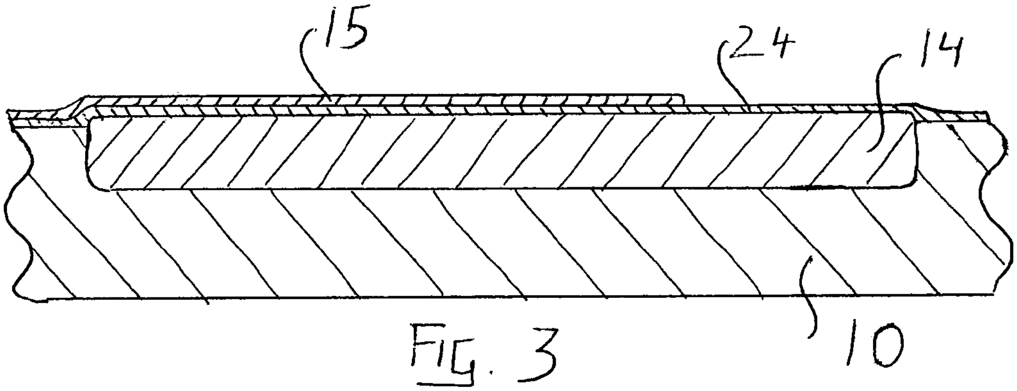
FIG. 3 is a view similar to FIG. 2, after printing of the substrate.

Once the ink has dried, therefore, the substrate with the magnetizable ink on it is subjected to pressure. It has been found experimentally that placing the substrate 10 in a flatbed press, and reducing the spacing between the plates 17 and 19 of the press to a distance approximately equal to the thickness of the cardstock 10, is satisfactory. Passing the substrate 10 through a pair of nip rollers at a similar spacing would also be satisfactory. The pressure indents the ink 14 into the substrate 10, as shown in FIG. 3. The ink 14 must be sufficiently tough not to shatter under the pressure, and sufficiently stiff not to ooze or to compress resiliently to an appreciable extent. Examples of suitable inks will be described below. However, it is believed that a wide range of plastic-based printing inks filled with magnetic particles will be satisfactory. The substrate must be sufficiently soft to compress non-resiliently to a substantial extent. It has been found that most grades of cardstock commonly used in the printing industry are satisfactory. Resilient compression of either the substrate or the ink should be avoided because the resilience will reduce the eventual indentation.

The card stock or paper needs to be about 2½ times as thick as the layer of magnetizable ink, to allow sufficient compression for the ink 14 to be left substantially flush with the surface 12 of the substrate 10. It is believed that a relatively soft PVC substrate would need to be at least twice as thick as the layer of magnetizable ink. In this embodiment, card stock about 0.5 mm thick is preferably used. Thicker card, preferably twice as thick, is preferred if magnetizable ink 14 is to be applied to both sides. The extra thickness may not be needed if the areas 14 of magnetizable ink on the two surfaces 12 and 13 do not overlap. An opaque material is usually preferred for the substrate 10, so that the magnetizable ink cannot be seen even from the back of the substrate.

As shown in FIG. 3, it is not necessary for the ink layer 14 to be perfectly flush with the surface of the substrate 10. A slight protrusion is acceptable. However, the protrusion should be sufficiently slight that it is not noticeable to the reader, and does not hinder subsequent overprinting of the substrate 10, either by fouling the ink applicators used or by creating a shadow area under the edge of the ink layer 14 that the overprinting ink does not reach.

If the magnetizable ink 14 has been applied to the second surface of the substrate 10, further finishing may be unnecessary. Preferably however, especially if the magnetizable ink 14 has been applied to the first surface of the substrate 10, a layer of opaque white ink 24 or other uniform coating is applied to the surface 12 of the substrate 10. This coating 24 serves both to conceal the color and texture of the magnetizable ink 14 and to smooth out the visible edges slightly, and will provide a uniform ground layer for subsequent printing processes. Visible printing 15 may then be applied over the ground layer 24.

Figure 4:
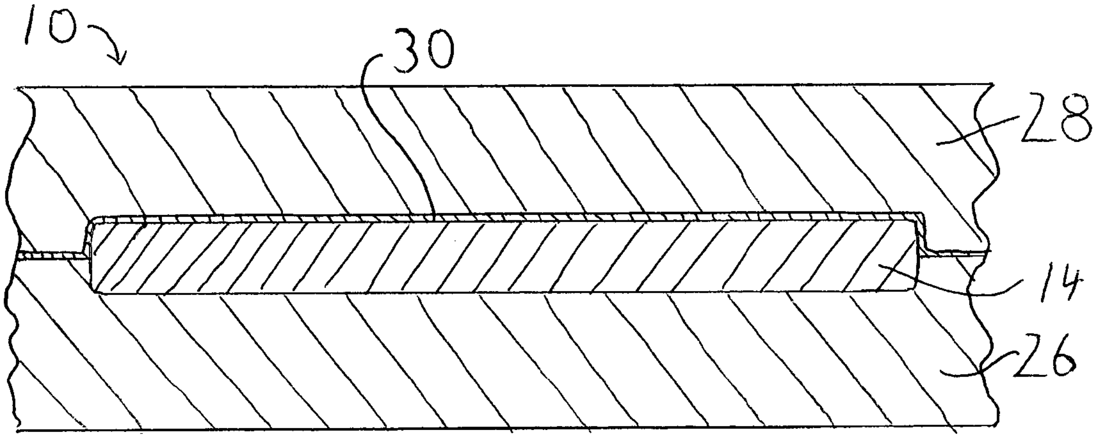
FIG. 4 is a view similar to FIG. 3 of an alternative form of the substrate.

Referring now to FIG. 4, in an alternative embodiment the substrate 10 consists of two layers of cardstock 26 and 28. The layers of cardstock 26 and 28 may each be 500 μm thick, and the layer of magnetizable ink 14 may be 200 μm thick. The magnetizable ink 14 is printed onto the reverse side of one layer of cardstock 26, substantially as described with reference to FIG. 2. The two layers of cardstock 26, 28 are then laminated together by applying a layer of adhesive 30 to the reverse side of the second layer of cardstock 28, and pressing the reverse faces of the two layers together. Many types of adhesives conventionally used for making laminated card, including vinyl based glues, and pressing processes conventionally used for making laminated card may be used. The thickness of the layer of magnetizable ink 14 is accommodated by compression of the cardstock layers 26, 28. The presence of the magnetizable ink 14 is revealed, if at all, only by a barely perceptible elevation of the first and second surfaces of the substrate 10.

The embodiment shown in FIG. 4 has the advantage that the visible surfaces of the substrate 10 are flat or virtually so, and of uniform color and texture, making subsequent printing easier and the ground layer 24 unnecessary. However, this embodiment has the disadvantage of a more complicated process to produce the laminated substrate, and the property (which is a disadvantage in many circumstances) that the layer of magnetizable ink 14 is 400 μm below the surface which, as discussed below, will result in weaker magnetic forces or require more magnetizable material.

As an alternative embodiment, in order to protect the graphic indicia 15, a transparent or clear sheet of material (not shown) can be laminated to the outer surface of the substrate 10. Alternatively, a layer of material could be laminated to the outer surface of the substrate 10, over the layer of magnetizable ink 14, and over or instead of the ground layer 24. The exposed surface of the laminating material could then be printed with the graphic indicia 15.

Once the magnetizable areas 14 are printed on the substrate 10, the magnetizable particles can be permanently magnetized. The magnetizable areas may be magnetized by using techniques such as passing an electric current through a wire or coil close to the magnetizable material, so that the magnetic field that arises around a flowing current impinges upon and magnetizes the magnetic field. The magnetization process will be discussed in more detail below.

The entire sheet of substrate may be exposed to a magnetic field that magnetizes all of the magnetizable areas 14. Alternatively, each of the magnetizable areas 14 or a portion thereof can be separately or "spot" magnetized, using processes such as electric coils by means of which electric current is passed over or brought into contact with specific areas of the magnetizable areas 14 to induce magnetization. Of course, other techniques or means in which to induce magnetization can also be used, including a strong permanent magnet. Since the magnetizable areas 14 are in the form of detailed designs and graphic images, any portion of the magnetizable areas 14 can be magnetized.

Hence, spot magnetization can be used to control the domain orientation of a particular magnetized area 14. For instance, discrete portions of the road 18 or the house 20 may be permanently magnetized, while the tree 16 may be left unmagnetized. Moreover, each of the magnetizable areas 14 can be magnetized to orient the domain or direction of polarization in the same or a different direction. In use, the domain orientation can be any direction within 360°. The advantage of using detailed designs and graphic images is that all or discrete portions of the magnetizable area 14 can be permanently magnetized in any direction. This feature is important particularly when the substrate 10 is used in the context of instructional or educational devices or books, as explained below.

Figure 5:
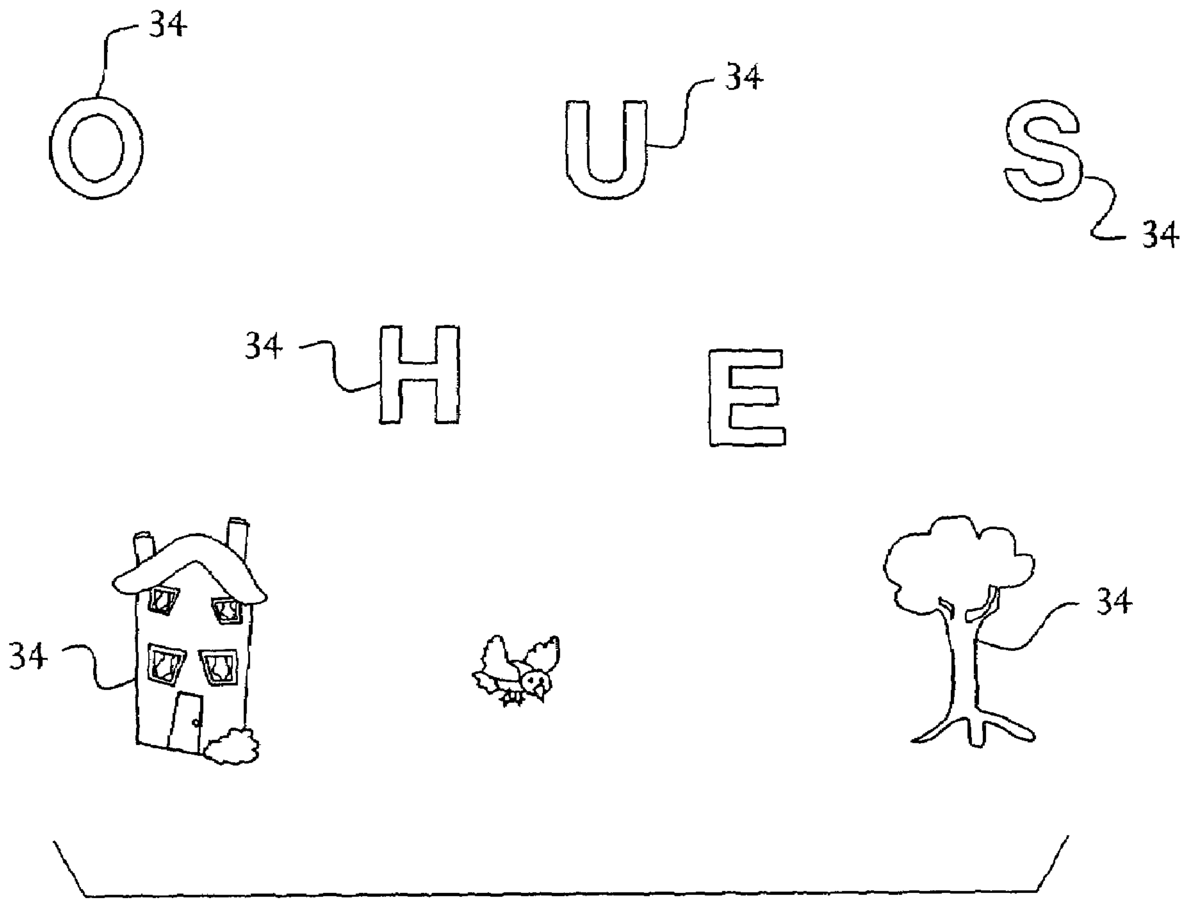
FIG. 5 illustrates a plurality of removable play pieces adapted to be magnetically attracted to the magnetizable areas on the substrate shown in FIG. 1.
Figure 6:
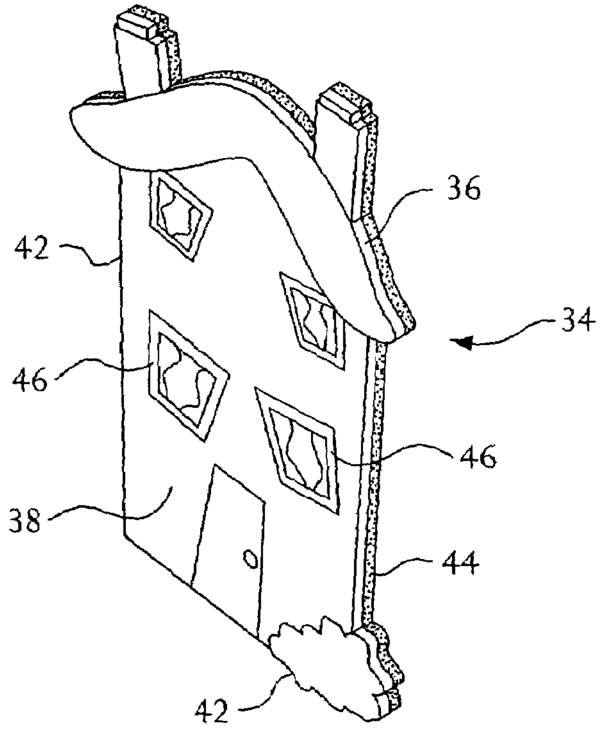
FIG. 6 is a front perspective view of one of the play pieces shown in FIG. 5.
Figure 7:
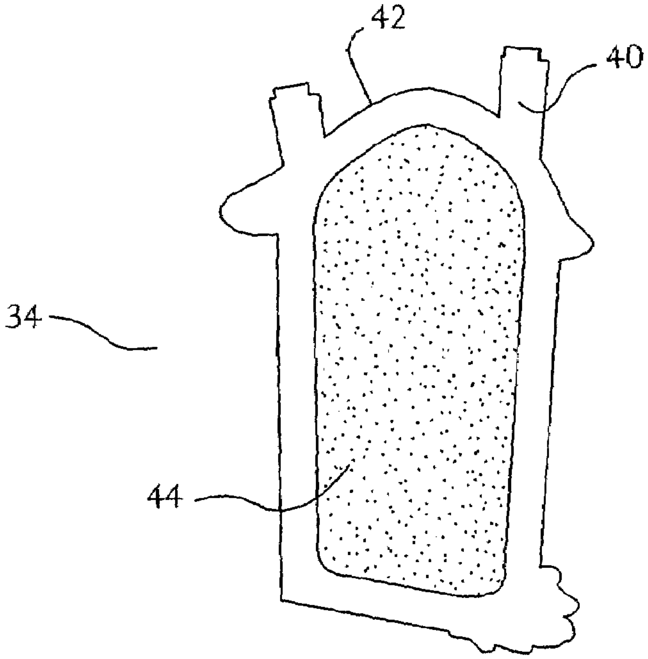
FIG. 7 is a rear view of the play piece shown in FIG. 6.

Turning now to FIGS. 5 to 7, a plurality of removable interactive items or play pieces 34 are shown. The removable play piece 34 includes any item, device, object, apparatus, product, component, or article of manufacture that is adapted to interact with the magnetizable areas 14 as described herein. The removable play pieces 34 are preferably themselves substrates 10 with magnetizable areas 44. The magnetizable areas 44 may be areas of magnetizable ink applied in accordance with the present invention. Alternatively, the magnetizable areas 44 on the play pieces 34 may be formed by some other technique. If the play pieces 34 are substrates having areas of magnetizable ink applied in accordance with the present invention, then the play surface of the substrate 10 may have magnetizable areas formed by some other technique.

The removable play pieces 34 may be used in the context of a book, as presently preferred, or may be used as part of any activity engaged in for education or amusement. Preferably, the removable play pieces 34 will correspond to and are adapted to interact with the magnetizable areas 14 applied to the play surface of the substrate 10 as shown in FIG. 1. The removable play pieces 34 shown in FIG. 5 include a house, a bird, a tree, and the letters "H", "O", "U", "S" and "E". Other items could also be used.

Referring now to FIGS. 6 and 7, an example of one of the removable play pieces 34 is shown. The removable play piece 34 (which is a depiction of a house) includes a substrate or support member 36, a front surface 38, a rear surface 40 and a circumferential edge 42. Preferably, the substrate 36 is a layer of material, such as paper or plastic, cut into the shape of a house. The house is sized and shaped to correspond directly with the shape of the house 20 formed by the magnetizable area 14 that appears on the substrate 10. Accordingly, the removable play piece 34 can be positioned over the magnetized area 14 of the house 20 shown in FIG. 1.

The front surface 38 may include graphic indicia 46 as shown in FIG. 6. The graphic indicia 46 may be thematically related to the book, the magnetizable areas 14 printed on the substrate 10, or may be any type of illustration, color or pictorial design, or even text. To enhance the appearance of the removable play piece 34 shown in FIG. 4, the graphic indicia 46 include windows, a door, and a bush. Therefore, the graphic indicia 46 contribute toward the interactive characteristics of the removable play piece 34. Of course, the graphic indicia 46 may be eliminated or replaced with other display items or surface treatments.

Magnetic material 44 is applied to the rear surface 40 of the removable play piece 34. The purpose of the magnetic material 44 is to provide a substance for interacting with the magnetizable areas 14 printed on the substrate 10 by magnetic attraction. In that way, the magnetic material 44 allows each of the removable play pieces 34 to be placed on or attached to the magnetizable areas 14 of the substrate 10. If one of the magnetic layers 14 and 44 is magnetized, then the play piece 34 can typically be attached anywhere on the play surface that there is a magnetic area 14. If both the magnetic material 44 on the removable play piece 34 and the magnetizable areas 14 on the substrate 10 are permanently magnetized, then their interaction may influence the positioning of the play piece 34.

The magnetic material 44 can be in the form of flexible magnetic material, or even a rigid magnet. In the preferred embodiment, the magnetic material 44 is the magnetic ink used to make the magnetizable areas 14 that appear on the substrate 10. The magnetic material 44 may be applied to cover the entire surface, as shown in FIG. 6, or only a portion thereof, as shown in FIG. 7. If magnetic ink is used, the play piece 34 can be permanently magnetized using electronic coils or other devices, as already described. If the magnetizable areas 14 are magnetized, then the removable play pieces 34 can be made with non-magnetized material, and vice-versa. However, it will usually be necessary for at least one of the magnetizable areas 14 and 44 to be permanently magnetized. If both the magnetizable area 14 and the magnetizable area 44 are permanently magnetized, then special interactions may be produced by selecting the direction of magnetization, as will be discussed in more detail below.

Figure 8:
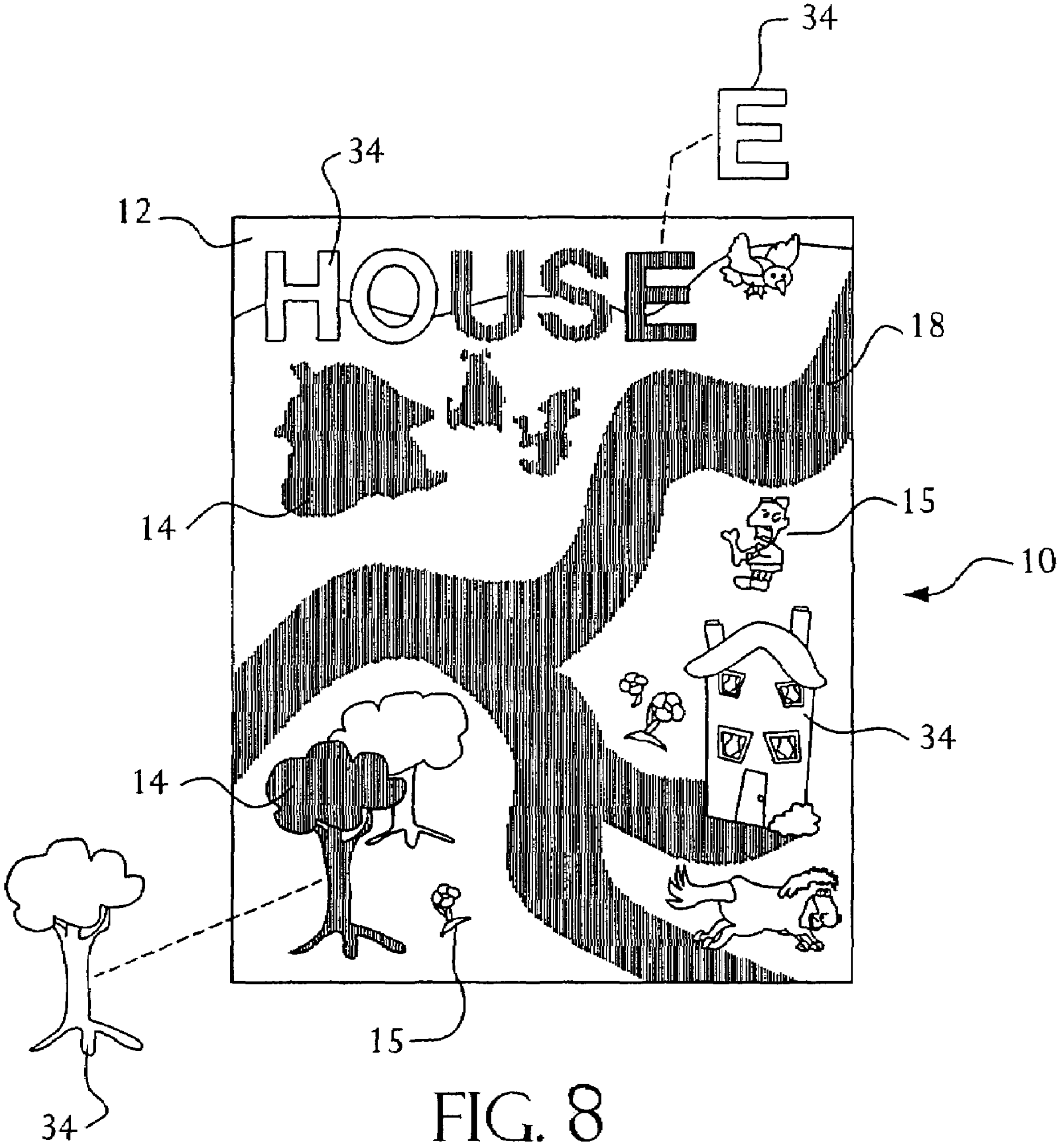
FIG. 8 illustrates the play pieces shown in FIG. 5 applied to the substrate shown in FIG. 1.

As best seen in FIG. 8, the removable play pieces 34 can be positioned on the substrate 10 over the corresponding magnetizable areas 14. Accordingly, for example, children can learn to spell the word "house" by placing the letters "H" "O" "U" "S" and "E" on the appropriate area on the substrate 10. Children can also learn the location of a house or where a tree is located in relation to a road. The magnetic attraction between the magnetizable areas 14 and the removable play pieces 34 will ensure that the removable play piece 34 will not fall off once it is placed on the corresponding magnetizable area 14.

If only one of the magnetizable areas 14 and 40 is magnetized, the strength of attachment of the play pieces 34 to the substrate 10 will depend on the location of the play pieces, and specifically on the area of overlap of the magnetizable areas 14 and 40. In particular, the letters "H" "O" "U" "S" and "E" will be strongly attached only if they are correctly positioned and aligned, because the shape of those pieces means that the area of overlap will decrease rapidly if there is even a slight error in positioning.

With play pieces 34 and magnetizable areas 14 of more compact shape, the magnetic attraction will be less sensitive to the exact alignment. Thus, if only one of the magnetizable areas 14 and 44 is magnetized, the house 34 could be placed on the house area 20 in any orientation, and/or substantially off-center. It may therefore be preferred to magnetize both of the magnetizable areas 14 and 44 for the house, and to polarize the magnetizations so that the house will at least be constrained as to its orientation, as discussed below.

Figure 9:
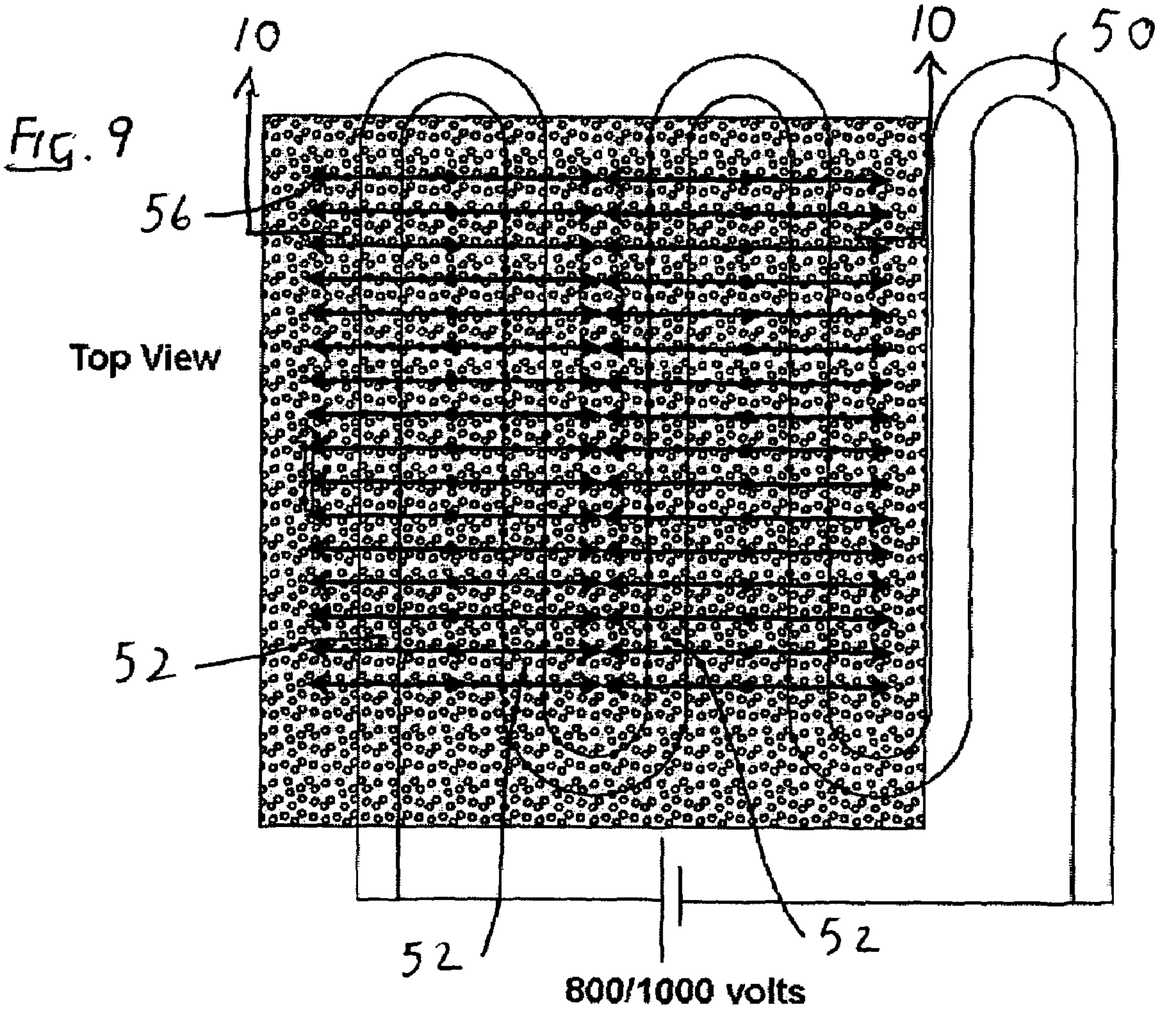
FIG. 9 is a diagrammatic plan view of one form of device for permanently magnetizing a layer of magnetizable ink applied to the substrate of the present invention.
Figure 10:
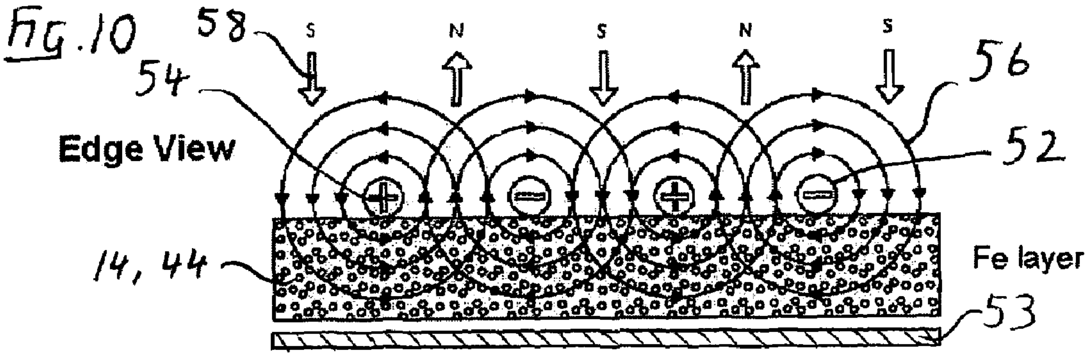
FIG. 10 is a section along the line 10—10 in FIG. 9.

Referring now to FIGS. 9 and 10, one method of permanently magnetizing the magnetizable layer 14 or 44 comprises laying an electrical conductor 50 of zigzag shape over the magnetizable layer, so that the latter is crossed by a plurality of straight, evenly spaced wires 52. A current is caused to flow in the conductor 50, and flows in opposite directions in alternate wires 52, as shown by the + and − signs 54 in FIG. 10. This current produces around each wire 52 a circulating magnetic field, represented by the arrows 56 in FIGS. 9 and 10, which induces a corresponding magnetization in the magnetizable layer 14, 44. Most significantly for the present invention, the areas between the wires 52 are magnetized generally perpendicularly to the surface of the layer 14, 44, with alternate North and South poles presented to the exterior, as shown by the letters N and S and the directions of the arrows 58 in FIG. 10. This produces a magnetic layer 14, 44 with evenly spaced, alternating, swathes of North and South poles. As shown in FIG. 11, this results in a magnetic field 60 above the surface of the magnetic layer 14, 44 that arches from each North pole swathe to the South pole swathes adjacent to it.

A magnetically soft iron plate or yoke 53 may be placed on the side of the substrate 10, 36 opposite the conductor 50. As is well known in other contexts, such a yoke will cause the magnetic field lines from the wires 52 to extend more nearly straight from the plane of the wires to the yoke. This will cause a more nearly vertical magnetization of the material of the magnetic layer 14, 44, the purpose of which will be explained below with reference to FIG. 14.

When the magnetizing conductor 50 is energized, the magnetizable layer 14 is immediately magnetized. The magnetic field of the magnetized layer 14 interacts with the field of the magnetizing conductor 50, so that the substrate 10 is attracted to the magnetizing device. However, it is found in practice that the substrate 10 may be attracted somewhat unevenly, so that air pockets form between the magnetizable layer 14 and the magnetizing device. This results in the magnetic field strength at the magnetizable layer, and consequently the induced magnetism, being slightly uneven. It has been found that if a second pulse of current is passed through the conductor 50 immediately after the initial magnetizing current, the substrate 10 is attracted to the magnetizing device more strongly and more evenly, because of the magnetization induced by the first pulse of current, and a more even magnetization of the layer 14 results.

In one embodiment, the coil was 380 mm×210 mm, and was energized with a 4 kJ pulse of approximately 10 ms duration from a 3200 μF capacitor charged to 1000 volts, implying a peak current of the order of 1 kA. The generator used had a sustained current output of 10 amps at 1700 volts, allowing the capacitor to be charged and discharged several times per second.

The ink may be magnetized while it is still wet or only partly dried. This would tend to cause the magnetizable particles to concentrate at the surface of the ink layer nearer to the magnetizing device. The resulting thinner but denser layer of magnetizable particles may be advantageous for some purposes. If the magnetic ink is magnetized from the printed surface, the magnetizing device would need to have a surface or covering of a material to which the magnetic ink does not adhere. Alternatively, however, the magnetic ink may be magnetized by a magnetizing device on the underside of the substrate 10.

Referring now to FIG. 12, if a substrate 36 with a magnetized layer 44 is placed adjacent to a substrate 10 with a non-magnetized magnetizable layer 14, the magnetic field from the layer 44 induces magnetism in the layer 14, and the magnetized layers attract, producing a force that holds the two substrates together. The strength of the magnetic force is determined by the strength of the field from the magnetized layer 44, where it passes through the non-magnetized layer 14. It is the component of the force perpendicular to the two substrates 10 and 36, and therefore the component of the field perpendicular to the two substrates, that is effective in holding the two substrates together.

Figure 13:
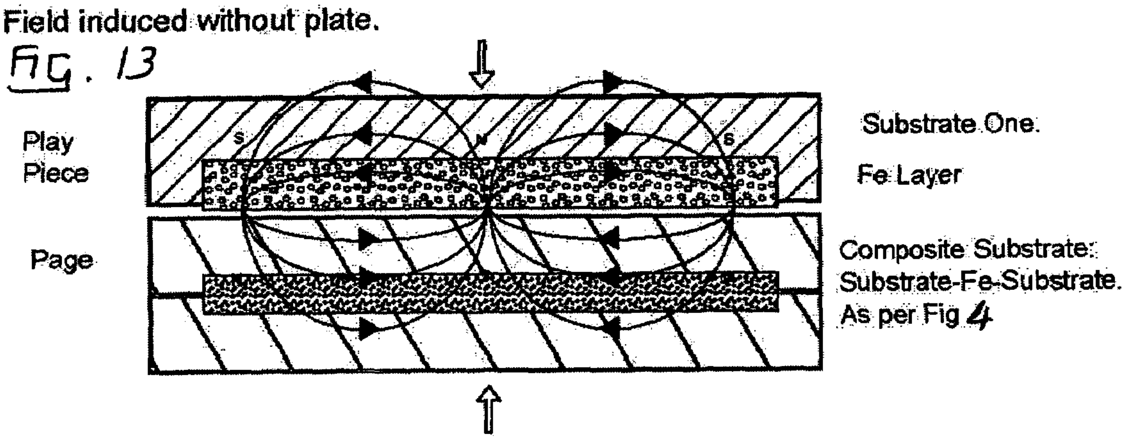
FIGS. 13 and 14 are diagrams similar to FIG. 11, showing the magnetic field in alternative embodiments of the substrate.

In FIG. 12, the two magnetizable layers 14 and 44 are shown on the facing surfaces of their respective substrates, and are almost immediately adjacent. As shown in FIG. 13, if one of the magnetizable layers is embedded in a laminated substrate 10 as shown in FIG. 4, the separation between the two magnetizable layers is greater. The magnetic field 60 from the permanently magnetized layer 44 must then extend further from that layer, in order to have a strong component perpendicular to the substrates 10 and 36 where it passes through the other magnetizable layer 14. As shown in FIG. 13, this may be achieved by increasing the pole pitch. The pole pitch is the spacing between two adjacent North poles or two adjacent South poles, which is equal to twice the spacing between successive wires 52 of the magnetizing device shown in FIGS. 9 and 10.

The optimum pole pitch ranges from about 1 mm to about 5 mm, depending primarily on the separation between the between the two magnetizable layers 14 and 44 when the substrate and the play piece 34 are attached to one another. Larger separations tend to require both magnetizable layers 14 and 44 to be permanently magnetized. For example, with a magnetizable layer 14 that is 200 μm thick and is covered by a 100 μm ink layer, and a magnetizable layer 44 that is 300 μm thick and is covered by a 200 μm paper layer, the centers of the two magnetizable layers are 550 μm apart. With this separation, the optimum attractive force is achieved if both magnetizable layers 14 and 44 are permanently magnetized with a pole pitch of approximately 3 mm.

Figure 14:
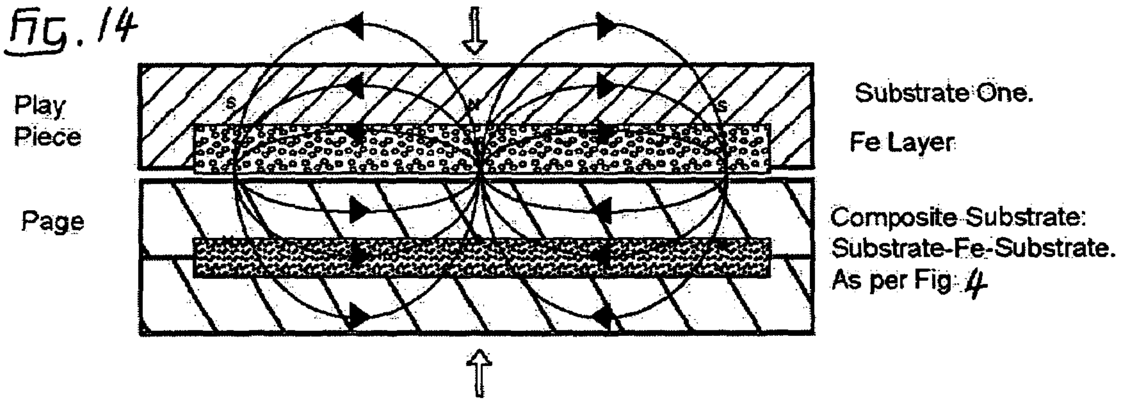

As shown in FIG. 14, the height of the magnetic field may also be increased by using a magnetizing device with a yoke 53 of magnetically soft ferromagnetic material, such as a plate of iron, on the side of the substrate opposite the conductor 50. The yoke causes the magnetic field lines to pass more nearly straight through the magnetizable ink. This causes a magnetization that is more nearly perpendicular to the general plane of the substrate, and a magnetic field that rises higher above the surface, than would otherwise be obtained with the same pole pitch.

With the uniform pattern of magnetization shown in FIGS. 9 to 14, a non-magnetized substrate will be attracted to the magnetized substrate as long as their magnetizable layers 14, 44 overlap. Two identically magnetized substrates with this pattern of magnetization will be attracted if their swathes of magnetization are parallel. They may then shift sideways by up to half of the pole pitch, so that the North poles of one align with the South poles of the other. If their swathes of magnetization are perpendicular, they will not be strongly attracted to one another, because areas of attraction and repulsion will substantially cancel out. If their swathes of magnetization are oblique, they will not be strongly attracted to one another unless they can twist into the parallel orientation. When applied to the house 20, 34 shown in FIGS. 1 and 5 to 8, this will allow the house 34 to be securely attached to the substrate 10 if it is the right way up or exactly upside down, but not if it is oblique or sideways.

When this pattern of magnetization is applied to substrates 10 bound into a book 11, as shown in FIG. 1, or otherwise positioned face to face, it is preferred to magnetize any directly facing magnetized areas 14 on facing pages 10 with the swathes of magnetization perpendicular. This minimizes the tendency of the pages 10 to stick together, and makes the book 11 much easier to open.

Referring now to FIGS. 15 and 16, the same principle may be used to produce non-uniform magnetizations. In FIG. 15, the conductor 50 is formed into a series of evenly spaced concentric circular loops 60, with the current circulating in opposite directions in adjacent loops, as shown by the arrowheads 62 in FIG. 15 and the + and − signs 64 in FIG. 16. This will form a pattern of magnetization with concentric circular swathes of North and South poles, as shown by the direction of the arrows 66 and the letters S and N in FIG. 16.

The radial connections 64 between adjacent loops 68, and the connection 70 returning the current from the innermost loop to the supply 72, may be set back axially away from the face of the magnetizing device that is applied to the substrate 10 or 36. This serves to minimize the distortion to the magnetization pattern caused by the current in those connections.

If both magnetizable layers 14 and 44 are magnetized with this pattern over their whole area, with swathes of poles of the same polarity at the same radius, they will not readily adhere to one another. If they are magnetized with swathes of poles of opposite polarity at the same radius, they will adhere strongly provided that they are positioned with the patterns of magnetization concentric, largely independent of the orientation of the two substrates.

Referring now to FIG. 17, a conductor arrangement similar to that of FIG. 9, but with the wires 52 unevenly spaced can be used to induce a distinctive code pattern of magnetization in the magnetizable layer 14. A code pattern can also be produced by arranging the wires 52 so that the directions of the current do not alternate. There would then be little or no magnetization of the magnetizable layer 14 in the swathe between two adjacent wires with the same current direction. A non-alternating current pattern can be produced either by connecting wires 52 that are not adjacent, or by connecting opposite ends of two wires 52 with a wire far enough from the magnetizable layer 14 not to cause magnetization.

Referring now to FIG. 18, a magnetizing device with two parallel loops 74, 76 carrying current in opposite directions will create a path having a swathe of magnetization of a first polarity between the loops 74, 76 and two swathes of a second, opposite polarity to either side of the first swathe. The swathes of magnetization may be created by magnetizing a strip of magnetizable material of corresponding shape previously applied to the substrate, such as the road 18 in FIG. 1, or may be formed within a larger magnetizable area 14. A movable device having a magnet with a pole of the second polarity will then naturally track the path, being attracted to the central swathe and repelled by the outer swathes. A suitable vehicle is shown in FIG. 14 of my above-mentioned U.S. Pat. No. 6,217,405. As shown in FIG. 18, the shape of the loops 74, 76 may be complex. By laying more than two parallel loops 74, 76 a structure with more than two swathes of magnetization may be created.

Figure 19:
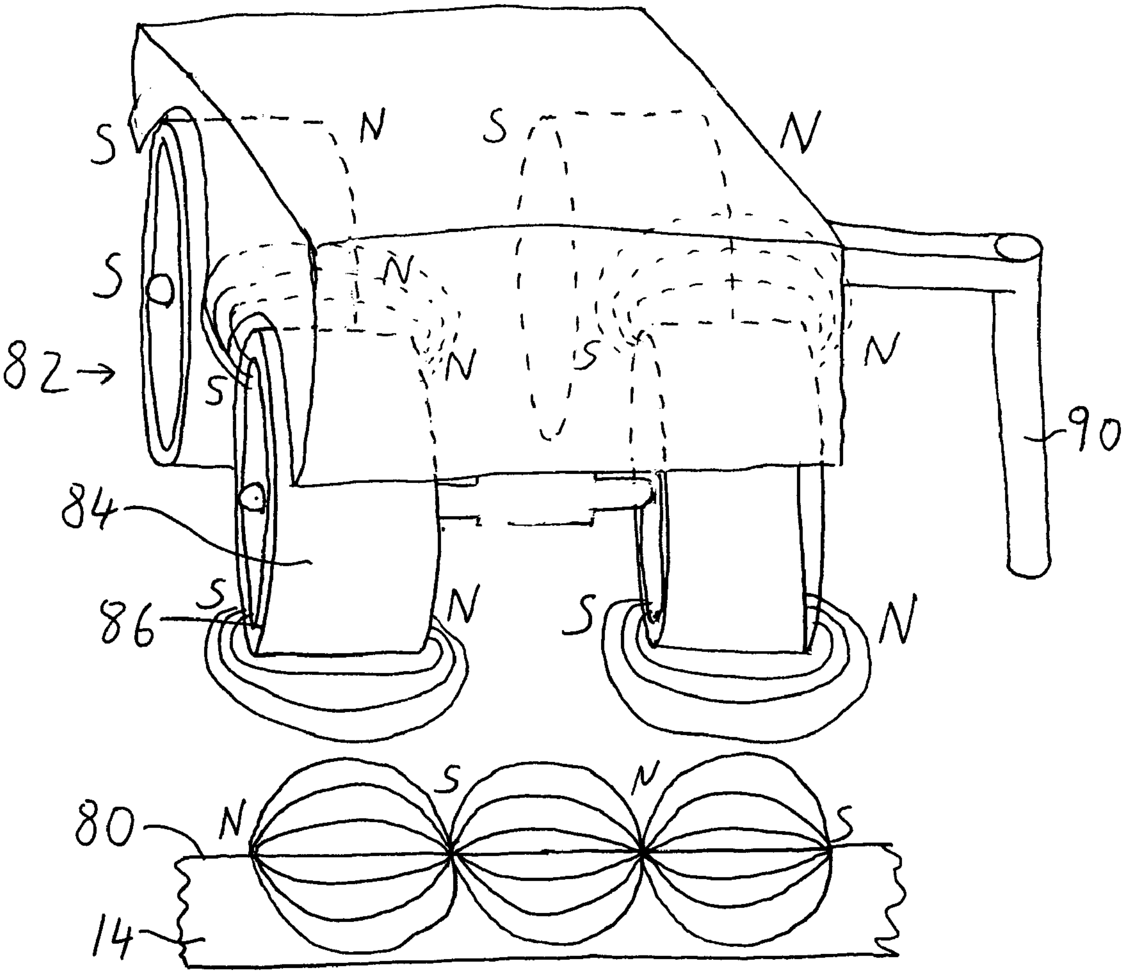
FIG. 19 is a section through a pattern of magnetization formed by a device similar to that shown in FIG. 18, and of a vehicle designed to cooperate with that pattern of magnetization.

Referring now to FIG. 19, a magnetizing device with at least three parallel wires with alternating current directions, corresponding to the wires 60 in FIG. 15 or the wires 74, 76 in FIG. 18, can form on a magnetizable substrate 14 a path 80 having four swathes of alternating North and South polarity. It may be preferred to use five wires to form four swathes, because the swathes outside the outermost wires may be rather diffuse. As shown in FIG. 19, a vehicle 82 with a pair of wheels 84 will adhere to the path if the treads of the wheels are formed of magnetized material with the correct pattern of magnetization.

As shown in FIG. 19, each wheel is slightly narrower than half a pole pitch of the path 80, and the centerlines of the wheels are one pole pitch apart. The treads of the wheels 84 consist of cylindrical tubes of magnetizable material 86, magnetized in the axial direction so that the poles of the magnetic field from each wheel line up with the swathes of magnetism in the path 80. As shown in FIG. 19, for a four (or more) wheeled vehicle the wheels on the same side are preferably aligned directly in front of one another and magnetized with the same polarity. Other forms of support elements, such as tank tracks, may be substituted for the wheels 84. Tracks, if suitably designed, may improve the adhesion of the vehicle to the path 80, but may increase the complexity and thus the weight and the cost, of the running gear. A tracked vehicle may also be less easy to steer than a wheeled vehicle.

Small radio-controlled, electrically-powered wheeled vehicles approximately 30 mm×60 mm and weighing about 19 grams are commercially available. One commercially available brand is "MicroSizers," supplied by Hobbico, Inc. These vehicles are conveniently supplied with the tires separate from the wheels, so that substituting magnetic tires requires no alteration to the vehicle itself. A single magnetized wheel 84 weighing 16 grams can support its own weight when attached to a path 80 formed in accordance with the invention on a vertical substrate. It is therefore believed to be within the ability of the person skilled in the art to equip such a vehicle with four wheels 84 and to reduce the overall weight sufficiently that the magnetic attraction to a track 80 can support the entire weight of the vehicle. Further weight could be saved by omitting the batteries and supplying power via a pickup from electrically conductive ink traces, if the visual effect of the ink traces (which would have to be on the surface) is acceptable. The pickup may be between the wheels, or outside the track 80.

One possible construction for the wheels 84 is a 20 mm diameter ABS plastic wheel with spokes of minimum thickness to support the wheel rim. On the wheel rim there could be a thin substrate layer, for example, 180 gsm paper, with a 0.5 or 0.4 mm thick magnetizeable ink. A magnetic field is induced in swathes extending in a circumferential direction, so that at the point of contact of the wheel with the track the swathes of magnetization are aligned parallel to the vehicle's axis. The width of the tire of the wheel 84 would be half the pole pitch or a multiple of half the pole pitch. Thus, the width of the wheel 84 might be 2 mm or 6 mm on a pole pitch of 4 mm.

Weight could also be saved by omitting any form of power steering, and modifying the steerable wheels to follow the magnetic path 80 passively. It has been confirmed experimentally that an unpowered vehicle rolling down a vertical substrate 10 under the force of gravity will remain attached to the magnetic track 80 and will follow the track. Switch points in the track 80 may be formed by short sections using electromagnets rather than permanent magnetization.

As shown in FIG. 18, instead of the vehicle being self propelled, it may have a magnetic element positioned to interact with an attraction-repulsion motor 87 embedded in the substrate 10 just outside the vehicle's path. The attraction-repulsion motor 87 consists of an array of parallel wires that carry a current flowing in opposite senses in alternate wires. In the same way as the magnetizing device shown in FIG. 9, the current in the wires 88 will generate an alternating magnetic field. A pole of a drive magnet 90 on the vehicle 82, if placed in the field, will be repelled by one pole of the field and attracted by an adjacent pole. By reversing either the current in the wires 88 or the polarity of the magnet carried on the vehicle with suitable timing, the repulsive and attractive force can propel the vehicle continuously in one direction. The motors 87 should be placed sufficiently far from the track 80 that their fields do not obscure or obliterate the magnetization of the track.

In order to power the vehicle through switch points, it is preferred to provide drive magnets 90 on both sides of the vehicle. Alternatively, the vehicle may be provided with drive magnets 90 at both ends of one side, if it is sufficiently long that the front drive magnet 90 will leave the switch point before the rear drive magnet 90 enters the switch point.

A sensor on the vehicle may detect coded signals, either generated directly or induced into the magnetizable layer 14 of the substrate 10 by a device such as that shown in FIG. 17, and the vehicle may be arranged to respond in any desired way to such coded signals. Since the signals will be invisible to human children playing with the vehicle 90, surprising responses may be attractive.

Figure 20:
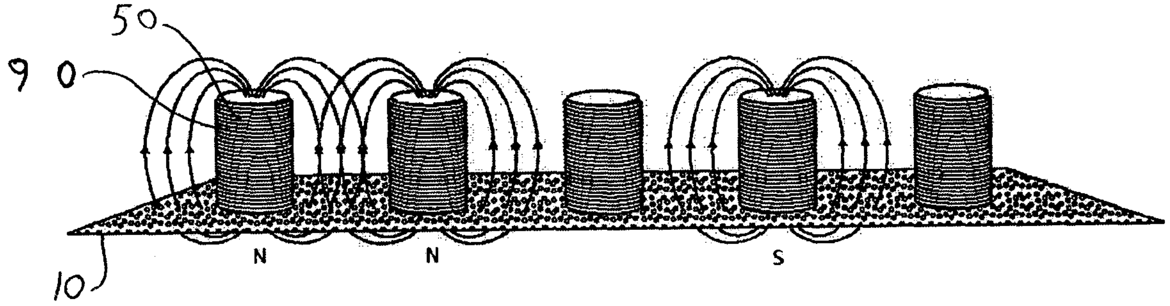
FIG. 20 is a view of a further form of magnetizing device.

Referring now to FIG. 20, a further form of magnetizing device has the conductor 50 formed into one or more coils 90, placed with one end in contact with, or close to, the substrate 10. Each coil 90 will produce a strong magnetic field of one polarity within it, and a more diffuse magnetic field of the opposite polarity outside it. Two or more adjacent coils polarized in the same direction will produce a row of strong poles of one polarity alternating with weaker poles of the opposite polarity. The pole pitch will be equal to the spacing between coils. In the interests of simplicity, only a single row of coils 90 is shown in FIG. 20, but it will be immediately understood how, by employing a two-dimensional array of coils 90, a substrate 10 with a magnetized layer 14 having an array of poles can be produced. As shown in FIG. 20, a more complex pattern of magnetization may be produced by energizing only some coils in a row of coils, or by reversing the polarity of some of the coils.

Figure 21:
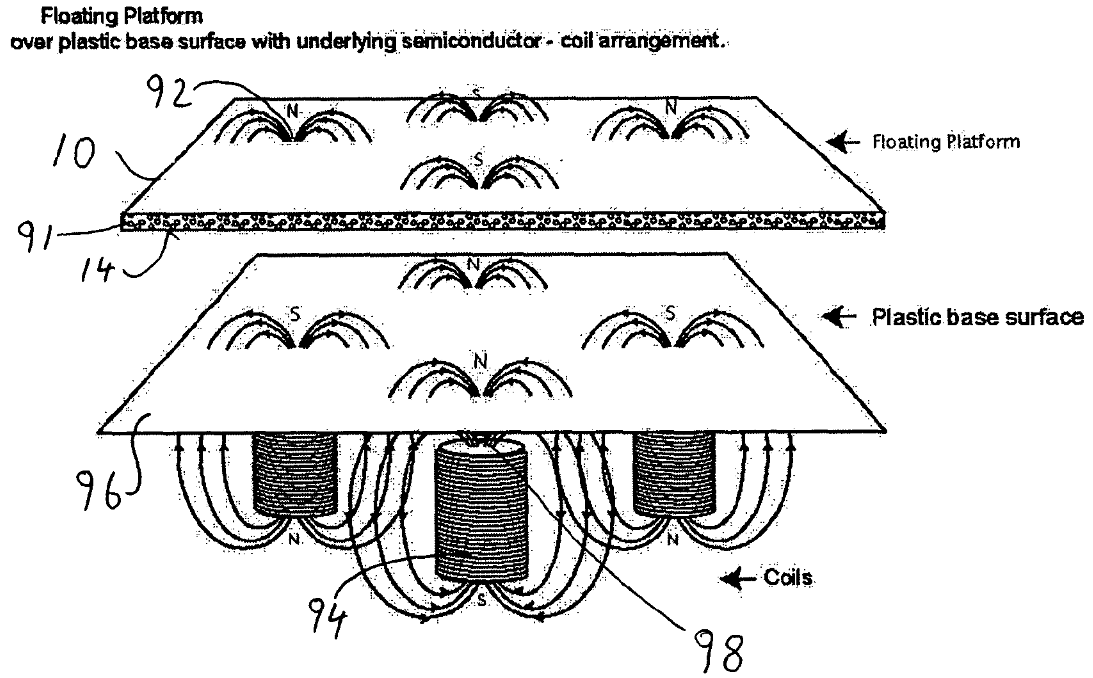
FIG. 21 is a view of a substrate magnetized by a device similar to that shown in FIG. 20, in cooperation with an electromagnetic device for generating a magnetic field.

Referring now to FIG. 21, a platform 91 consisting of a substrate 10 with a magnetized layer 14 having an array of poles 92 formed in accordance with FIG. 20 may be levitated by placing it over an array of coils 94 energized with a corresponding pattern and opposite polarities to the poles 92. The coils may have a diameter of 2 or 3 mm. The coils 94 may be concealed under a non-magnetic base surface 96, for example, of plastic.

If the spacing of the poles 92 and the coils 94 is exactly identical, the platform 91 may tend to drift sideways half a pole pitch, to a position where it would be attracted to the coils 94 and would no longer levitate. This can be countered by sensing the position of the floating platform 91 and selectively energizing the coils 94 with a polarity that opposes the pole 92 overlying each energized coil. The poles 92 and coils 94 may also be positioned in a less uniform array, so that as the floating platform 91 moves sideways the poles do not all move from the area of influence of one coil 94 to that of the next coil 94 simultaneously.

To detect the positions of the magnetic poles 92 in the floating platform 91, a sensor 98 is disposed immediately above each coil 94. The sensors 98 may be conventional semiconductor magnetic field sensors. At frequent intervals, the power to the coils 94 is shut off, allowing the sensors 98 to measure the field from the poles 92 alone. The correct direction of polarization for each coil 94 is then computed, and the coils are re-energized before the platform 91 has time to fall onto the base surface 96.

Figure 22:
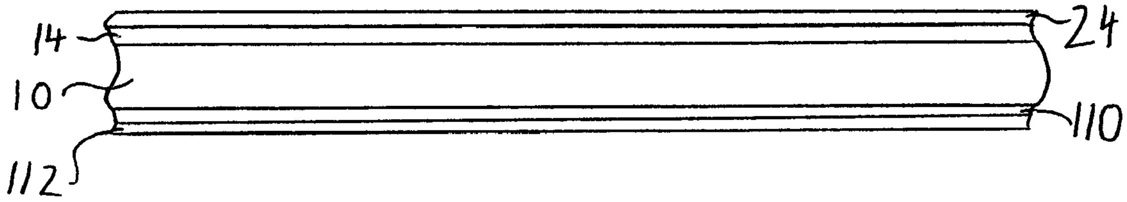
FIG. 22 is a fragmentary section through part of a further form of substrate according to the invention.

Referring now to FIG. 22, in a further form of the magnetizable substrate of the invention, a layer of magnetizable ink 14 is applied to one side of a substrate 10, which may be of paper or plastic as discussed above. The magnetizable ink 14 is covered with a decorative finish 24, which may be of opaque ink, foil, or any other suitable material. The opposite side of the substrate 10 is covered with a layer of adhesive 110, preferably a conventional self-adhesive or pressure sensitive adhesive, covered by a protective peel-off layer 112. The magnetizable ink layer 14 is permanently magnetized, as discussed above. The magnetized substrate may be die-cut to any convenient size and shape, either functional or decorative. The magnetized substrate may then be treated just like an ordinary self-adhesive label, except that it will apply an area of magnetism to any surface to which it is attached.

An object with such a label applied could be attached to almost any iron or steel surface, subject only to the object being light enough to be retained by the magnetic force. If such labels are applied to two separate surfaces, then normally nonmagnetic things can be attached to a surface that is not normally magnetic as well as to magnetizable surfaces. If magnetizable labels are applied to both surfaces, then in many cases only one of the labels need be permanently magnetized. In that case, care would need to be taken to apply a permanently magnetized label to at least one of two surfaces that are to be attached together.

Examples of uses for the magnetizable self-adhesive labels include attaching: a cup to a table or to the fiber glass body of a boat; a highway toll transponder to a windshield; gadgets to a wall; labels to a point of sale display or to a T-shirt; play pieces to a board game or to the back of a car seat; plastic parts or magnetized labels to plastic toys; play pieces or labels to a takeout fast food container; gadgets or folders to the plastic interior of a car, a magnetizable label to a bottle; etc.

Of course, in many cases, the ink could be printed directly onto one or both of the surfaces and then magnetized, which would dispense with the need for the separate magnetized self-adhesive label. However, the magnetized self-adhesive label could make any surface magnetic, with a cool-looking sticker that is thin, light weight, magnetic and inexpensive. In a way Magnix Base Units and Magnix stickers act as a kind of Velcro—with two parts.

Figure 23:
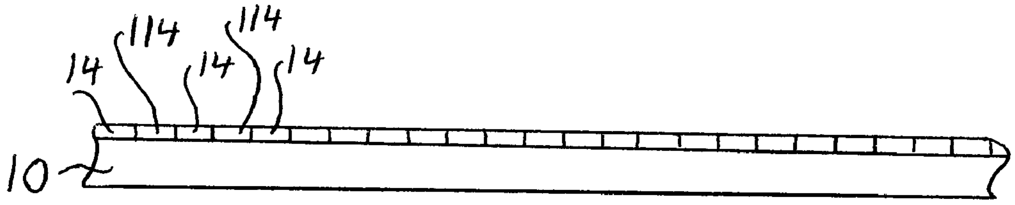
FIG. 23 is a fragmentary section through part of a further form of substrate according to the invention.

As was explained above, in many embodiments of the present invention the magnetizable ink is to be permanently magnetized in a predetermined pattern. Referring to FIG. 23, in such a case, the magnetizable ink 14 may be applied to the substrate 10 in a corresponding pattern. For example, if the ink 14 is to be magnetized in straight swathes, as shown in FIGS. 9 and 10, the ink may be applied in stripes corresponding to the swathes of magnetization. This may result in a perceptible corrugation of the surface. It is therefore preferred to print stripes of conventional ink 114 of corresponding thickness to fill in the spaces between the stripes of magnetic ink, producing a substantially even overall surface.

The need for two printings in registration will increase the cost of the printing process, but in many cases this may be compensated for by replacing a significant part of the magnetizable ink with cheaper conventional ink. The compensating ink stripes 114 may be omitted especially if the magnetizable ink layer is very thin, for example when, as shown in FIG. 17, the pattern of magnetization conveys data rather than affording mechanical support. In this technique of course the magnetizing coil needs to be in registration with the stripes of magnetizable ink. This can be achieved by conventional registration techniques used for multiple pass printing processes.

A suitable ink for the present invention should contain a high proportion of iron, typically in the form of iron ferrite or of a compound ferrite such as $SrFe_{12}O_{19}$, $BaFe_{12}O_{19}$, or NdFeB. The ink should encapsulate the iron particles so that they do not oxidize, should bond well to the substrate both when wet and when dry, and should retain when dry a flexibility comparable to that of the substrate. The ink should be without strong odor. The ink should be safe and easy to handle during manufacturing, and should be safe for children and comply with all relevant national and international safety standards for child-related products.

The magnetic ink generally includes a non-water based carrier, such as a medium, typically formulated for the printing process by which it is to be applied. Mediums can be colored and have various material properties, viscosities, and other Theological characteristics. The ink may have a consistency or viscosity ranging from that of warm molasses to that of heavy paste. The viscosity of the ink will depend upon the type of printing process used. Accordingly, the type of ink that may be chosen to formulate the magnetic ink discussed herein will depend, in part, upon the particular printing process or means used for applying the ink to a substrate.

Suspensions of iron particles in many resins and vinyl resins will work. However, the matrix that is presently preferred for printing on paper or cardstock is a low melting point styrene butadiene copolymer (SBC). Low melting point SBC is found to give the best results, with a minimum of residue resulting from undesolved SBC that could produce stringing between a silk screen and the substrate being printed, or other undesirable effects. Liquid laminate PVC is also considered suitable for offset printing.

The SBC is preferably suspended in kerosene or mineral spirits to form a medium in which the iron particles are then suspended. The kerosene or mineral spirits do not have a strong odor, and will evaporate away completely. The proportion of kerosene or mineral spirits can thus be adjusted within wide tolerances to suit the mechanical requirements of the particular printing process. The kerosene or mineral spirits can also be recovered from the air used to dry the ink, and reused. This reduces both the environmental impact of the process and the cost. The liquid medium can contain up to 40% or 45% of the SBC. A high proportion of resin in the liquid medium is important, because it makes it easier to achieve proper encapsulation and bonding together of the ferrite particles in the matrix, giving a durable and flexible ink. On the other hand, a higher proportion of the solvent results in a less viscous ink, which may be easier to print, especially with processes such as silk screening, where the ink must flow through a mesh. Because all of the ferrite materials are considerably denser than the matrix materials and solvents used, they tend to settle out. It is therefore preferred to homogenize the mixture by stirring with a mechanical mixer within 15 minutes before printing.

Ferrite particles of 30 μm or smaller may be used for both lithographic and silk screen printing. Smaller particles are preferred, especially for silk screening, because they pass through the screen more easily. This reduces the effective viscosity of the ink, and thus allows less solvent to be used. The reduction in the amount of solvent reduces drying time, cost of the ink, and cost of extracting and recovering solvent vapors. The use of smaller particles also increases the amount of ferrite that can be included in the ink. Vibrating the ink while it is still wet after printing may also assist in packing the magnetic particles more tightly, and thus increase the ferrite content for a given thickness of ink. Smaller particles also produce a smoother surface, especially on thin layers of ink. Finer particles are also easier to suspend in varnishes, which are preferred as media for spot printing. Suitable varnishes include Matt Lacquer G 95/50 supplied by Terra Lacke, and Brilliant Dexpro E/GV 2621, supplied by Valspar. However, the finer particles tend to be significantly more expensive, and it is therefore preferred to use particles no finer than is needed for a specific application.

The printing machinery should be thoroughly cleaned after use, both to avoid contamination of subsequent printing and to avoid unnecessary damage to the machinery from the abrasive effects of the ferrite powder.

Where iron is used, the iron particles are preferably in the form of commercially-available "double-scrubbed" or "two-time purified" ferrite powder. Ferrite powder that has been only "one-time purified" is adequate for at least some embodiments of the invention, but not optimal. The two-time purification leaves the ferrite powder substantially free from iron oxides, oxygen that might otherwise oxidize the iron after purification, and impurities including silicon based impurities that would dilute the iron content of the final ink layer. To prevent oxidation of the ferrite powder before it reaches the printers, it is preferred to ship and store the powder in a plastic bag, which is tied and placed in a second plastic bag, also tied. This is then placed in a woven bag, also tied, which is placed in a bucket with an airtight lid. Each bag preferably contains no more ferrite than will be needed for a single batch of ink and, for ease of handling, no more than 25 kg.

To form the magnetic ink, the magnetizable particles are added to the preselected ink. The magnetizable particles may be added using mixing, blending, or any other means for dispersing the magnetizable particles within the ink. It is recommended that this be done in a controlled atmosphere, to avoid unnecessary contamination or oxidation of the iron.

Where novel inks according to the present invention are used, and it is not required to compress the ink layer into the substrate, a much wider range of substrates is possible. For example, SBC based inks can be printed onto fabrics, plastic foil of the sort used for foil printing on book covers and boxes, or thin paper. Satisfactory results have been achieved with paper as light as 125 gsm. It is also believed to be feasible to print such inks onto hard substrates, such as ceramics, wood, fiberglass, alumninum, glass, and molded plastics. The skilled reader will understand how the various aspects and advantages of the invention discussed herein may be adapted to these different media, and especially to substrates that have the flexibility of thin paper or of cloth, or are not flat.

The following examples of magnetizable inks for the magnetizable areas 14 illustrate the invention.

EXAMPLE I

Double-scrubbed Fe particles with a particle size in the range of from 20 μm to 40 μm were suspended in a mixture of low molecular weight styrene-butadiene copolymer and kerosene, in the following proportions by weight. The styrene-butadiene copolymer was a low melting point grade of K-Resin® supplied by Chevron-Philips Chemical Company LP.

| | |
|---|---|
| Fe powder: | 85% |
| SBC: | 6.75% |
| Kerosene: | 8.25%. |

The ink was applied by silk screening to a standard printer's cardstock and allowed to dry naturally. The dry ink consisted of 92.6% Fe and 7.4% styrene-butadiene copolymer in a layer 100 μm thick. The Fe particles were satisfactorily encapsulated, and the dry ink was sufficiently flexible to withstand compression into the cardstock and normal wear and tear as the book was read.

EXAMPLE II

Double-scrubbed Fe particles with a particle size in the range of from 20 μm to 40 μm were suspended in a mixture of low molecular weight PVC and mineral spirits, in the following proportions by weight.

| | |
|---|---|
| Fe powder: | 85% |
| PVC: | 6% |
| Mineral Spirits: | 9%. |

The ink was applied by offset lithography in a sheet-fed press as a spot-printed laminate to a standard printer's cardstock and allowed to dry naturally. The drying time was rather long, which precluded the use of a continuous-feed press. The dry ink consisted of 93.4% Fe and 6.6% PVC in a layer 80 μm thick. The Fe particles were satisfactorily encapsulated, and the dry ink was sufficiently flexible to withstand compression into the cardstock and normal wear and tear as the book was read.

EXAMPLE III $SrFe_{12}O_{19}$ powder with a nominal particle size of 2 μm was suspended in a mixture of low molecular weight low molecular weight styrene-butadiene copolymer and kerosene, in the following proportions by weight.

| | |
|---|---|
| $SrFe_{12}O_{19}$ powder: | 58% |
| SBC: | 8% |
| Mineral Spirits: | 34%. |

The ink was applied by offset lithography in a sheet-fed press to 230 gsm SIC card and allowed to dry naturally. The dry ink consisted of 88% $SrFe_{12}O_{19}$ and 12% SBC in a layer 200 μm thick. The $SrFe_{12}O_{19}$ particles were satisfactorily encapsulated, and the dry ink was sufficiently flexible to withstand compression into the cardstock and normal wear and tear.

EXAMPLE IV

An ink similar to that of Example III was formulated in the following proportions by weight.

| | |
|---|---|
| $SrFe_{12}O_{19}$ powder: | 79% |
| SBC: | 7% |
| Mineral Spirits: | 14%. |

The dry ink consisted of 92% $SrFe_{12}O_{19}$ and 8% SBC. The ferrite was found to be satisfactorily encapsulated in the SBC matrix. The substrate could be bent to an angle of approximately 90° without the dry ink breaking, and the dry ink did not fragment.

With ink formulated similarly to Examples I and II, but with 90% Fe content after drying, it was possible to support useful loads with a layer of ink as thin as 40 μm. The spot laminate process has so far been successfully used only for layers up to 80 μm thick. Greater thicknesses of ink can be built up by repeated passes through the press.

A layer of non-magnetized ink 100 to 200 μm thick, with its top surface 100 μm below the printed surface of the substrate, interacting with a play piece 34 with a magnetizable area 44 that is 400 to 500 μm thick and permanently magnetized in accordance with FIG. 1 1 with a pole pitch of 3 mm, can support a load of 0.3 to 0.5 g/cm$^2$ against gravity with the substrate vertical or face-down. The maximum field strength is 586 gauss, 200 μm above the surface of the magnetized layer. The 400 μm thick magnetizable ink layer on the play piece itself weighs only 0.08 g/m$^2$. If both magnetizable layers are permanently magnetized, the field strength, and thus the load-bearing capacity, increases by approximately 50%, giving a maximum field strength of approximately 879 gauss.

With both the magnetized and the non-magnetized areas 200 μm thick, and a 2 mm pole pitch, the maximum field strength (approximately 200 gauss) occurs with a 100 μm separation between the magnetizable layers. The load that can be supported is approximately 0.18 g/cm$^2$ (1.8 kg/M$^2$). The supported ink layer itself weighs 0.04 g/cm$^2$.

With the magnetized layer 100 μm thick and the non-magnetized layer 200 μm thick, and a 1.2 mm pole pitch, the maximum field strength (approximately 170 gauss) occurs with a 50 μm separation between the magnetizable layers. The load that can be supported is approximately 0.12 g/cm$^2$ (1.2 kg/m$^2$). The 100 μm thick ink layer itself weighs 0.02 g/cm$^2$.

With the magnetized layer 50 μm thick and the non-magnetized layer 200 μm thick, and a 0.8 mm pole pitch, the maximum field strength (approximately 120 gauss) occurs with a 25 μm separation between the magnetizable layers. The load that can be supported is approximately 0.08 g/cm$^2$ (1.2 kg/M$^2$). The 50 μm thick ink layer itself weighs 0.01 g/cm$^2$. With both layers permanently magnetized, the peak field strength will be approximately 180 gauss, and the maximum supported weight will be approximately 0.12 g/cm$^2$.

The following magnetic field strengths were measured for samples of material in accordance with Example I magnetized by a device as shown in FIG. 9, using a capacitative generator as described above with reference to FIG. 20. The thickness and pole pitch of each sample are shown in Table 1.

TABLE 1

| Sample | Pole pitch | Thickness of magnetized Fe layer | Thickness of other Fe layer | Space between Fe layers | Load supported |
|---|---|---|---|---|---|
| 1 | 3 mm | 500 μm | 200 μm | 300 μm | 0.4 g/cm$^2$ |
| 2 | 1.8 mm | 500 μm | 200 μm | 300 μm | 0.3 g/cm$^2$ |
| 3 | 5 mm | 1 mm | 200 μm | 400 μm | 0.7 g/cm$^2$ |
| 4 | 2 mm | 1 mm | 200 μm | 400 μm | 0.9 g/cm$^2$ |

For each sample, Table 2 gives the strength in gauss of the magnetic field component perpendicular to the surface of the substrate at two heights above the surface of the magnetized Fe layer at the center of each of a row of adjacent poles.

TABLE 2

| Sam- | Height | Polarity | | | | | | | |
|---|---|---|---|---|---|---|---|---|---|
| ple | (mm) | N | S | N | S | N | S | N | S |
| 1 | 300 | +458 | −76 | +455 | −68 | +470 | −68 | +455 | −70 |
| | 0 | +570 | −197 | +585 | −209 | +586 | −195 | +570 | −190 |
| 2 | 300 | +408 | −26 | +410 | −22 | +400 | −16 | +292 | −18 |
| | 0 | +542 | −157 | +538 | −157 | +538 | −154 | +542 | −142 |
| 3 | 400 | +603 | −230 | +611 | −235 | +621 | −228 | +515 | −288 |
| | 0 | +704 | −336 | +719 | −320 | +720 | −288 | +696 | −318 |
| 4 | 400 | +490 | −161 | +501 | −141 | +482 | −130 | +500 | −300 |
| | 0 | +634 | −304 | +632 | −308 | +647 | −268 | +642 | −300 |

As an alternative embodiment, the present invention is versatile enough so the magnetizable areas may be applied or printed onto the substrate 10 in the form of readable segments or dots to produce code or an analog signal.

The present invention may be embodied in other specific forms without departing from the spirit or essential attributes thereof and, accordingly, reference should be made to he appended claims, rather than to the foregoing specification, as indicating the scope of the invention.

For example, substrates 10 have been disclosed with a magnetizable layer 14 on one surface, or sandwiched in the middle, interacting with separate magnetizable play pieces 34 on one side 12 of the substrate. A substrate with the magnetizable layer sandwiched in the middle can interact with magnetizable play pieces 34 on either or both sides of the substrate. A sufficiently thick substrate can have magnetizable layers 14 applied to both surfaces 12. The layers 14 can be of different shapes, and/or can have different patterns of magnetization applied to them. Provided that the substrate 10 is sufficiently thick, the use of one side 12 of the substrate will not be unduly affected by the magnetic field from the magnetizable layer on the other side of the substrate. This is particularly appropriate in the case of a book 11, where it is usual for the two sides of a leaf to have different content.

In an alternative embodiment, it is contemplated that the magnetizable areas 14 may be applied to the first surface 12 of the substrate 10 in the form of electrical traces as part of an electric circuit used to support interactive devices such as light emitting diodes, speakers, lights or other audio and visual type displays. It is also contemplated that electrical traces may be positioned on the first surface 12 to include two or more contact points spaced a short distance away from each other. An electrical circuit may be closed by the heat or moisture of a finger or by one of the play pieces bridging the contact points. When the contact points are bridged, and the circuit closed, energy will flow through the circuit so that the interactive device is energized.

Various means for forming and controlling the magnetic fields produced by the magnetizable layers 14 have been described. Various patterns and interactions of the magnetized layers have been described. It will be understood that these can be combined in numerous ways. The key factors in creating a magnetic interaction between a permanently magnetized play piece and a permanently magnetized play surface are presently believed to be: the position of the magnetic poles; the spacing of the magnetic poles; the direction of any arranged poles; the pattern of North and South poles; the strength of the induced fields; any variation in the strength of poles of different polarities; and the height of the fields above the magnetized surface. Any combination of these factors can produce a specific interaction. For example, positioning linear field patterns at right angles to each other will produce a very weak attractive force. Positioning polarities so that a sufficient number of North poles are opposite North poles and South poles are opposite South poles will produce a repulsive force; and positioning predominantly North poles opposite South poles will produce an attractive force, even without changing any of the other factors.

Although the magnetic ink layer 14 has been described as being applied in the form of a suspension of ferrite particles in a medium, the particles and the medium could be applied separately. For example, a layer of glue or varnish may be applied to the substrate 10, a layer of ferrite particles may be applied to the glue or varnish while it is still wet, and a further coating of glue or varnish may then be applied to encapsulate and secure the ferrite particles. The varnish may be, for example, a UV curable varnish, enabling the operator to ensure a sufficiently long open time without a correspondingly long drying time.

The invention claimed is:

1. A method of making a magnetically interactive substrate, comprising the steps of:

providing a compressible substrate;

applying a magnetizable ink to at least one selected area of a surface of the substrate; and applying pressure to said magnetizable ink and thereby indenting said magnetizable ink into said surface of said substrate and compressing the substrate with the magnetizable ink applied such that the change in thickness at the edges of the magnetizable ink becomes imperceptible to an ordinary end user.

2. A method according to claim 1, wherein the step of applying pressure comprises compressing the substrate in a flatbed press.

3. A method according to claim 1, further comprising the step of applying an opaque layer over the magnetizable ink.

4. A method according to claim 3, comprising applying said opaque ink layer over the entire area of said surface of the substrate.

5. A method according to claim 3, wherein said opaque ink layer is similar in color to said surface of said substrate.

6. A method according to claim 1, further comprising the step of applying visible printing to said surface of said substrate.

7. A method of making a magnetically interactive substrate, comprising the steps of:

providing a compressible substrate;

applying a magnetizable ink to at least one selected area of a surface of the substrate;

applying pressure to said magnetizable ink and thereby indenting said magnetizable ink into said surface of said substrate and compressing the substrate with the magnetizable ink applied such that the change in thickness at the edges of the magnetizable ink becomes imperceptible to an ordinary end user applying an overprinted ink or coating to said substrate; and applying visible printing over said overprinted ink or coating.

8. A method of making a magnetically interactive substrate, comprising the steps of:

providing a compressible substrate;

applying a magnetizable ink to at least one selected area of a surface of the substrate;

applying a second substrate layer over said surface of said substrate over said magnetizable ink, and applying pressure to said substrate and said second substrate layer with said magnetizable ink between them and thereby compressing the substrate and second substrate layer with the magnetizable ink between them to a thickness such that the change in thickness at the edges of the magnetizable ink becomes imperceptible to an ordinary end user.

9. A method according to claim 8, further comprising the step of applying adhesive to said second substrate layer, and comprising applying the surface of said second substrate layer with said glue to the surface of said substrate with said magnetizable ink, and applying said pressure before said adhesive has set.

10. A method according to claim 8, further comprising the step of applying visible printing to an exposed surface of at least one of said substrate and said second substrate layer.

11. A method according to claim 1, further comprising the step of imparting a permanent magnetization to at least part of at least one said area of magnetizable ink.

12. A method according to claim 11, comprising imparting said permanent magnetization by subjecting said magnetizable ink to the magnetic field of an electric current.

13. A method according to claim 12, wherein said electric current is caused to flow in parallel conductors.

14. A method according to claim 13, wherein said current is caused to flow in opposite directions in alternate conductors.

15. A method according to claim 13, wherein said parallel conductors comprise several straight conductors.

16. A method according to claim 15, wherein said straight, parallel conductors are evenly spaced.

17. A method according to claim 16, wherein the conductors are spaced apart by a distance of from approximately 0.5 mm to approximately 5 mm.

18. A method according to claim 13, wherein said parallel conductors form a substantially closed path.

19. A method according to claim 12, wherein said current is caused to flow in at least one coil with its axis perpendicular to said surface of said substrate.

20. A method according to claim 11, comprising displacing particles of magnetizable material within said ink layer by applying a magnetic field before said ink is dry and thereby imparting said permanent magnetization.

21. A method according to claim 1, wherein said substrate is selected from the group consisting of art paper, card, and polyvinyl chloride.

22. A method of making a magnetically interactive substrate, comprising the steps of:

providing a compressible substrate;

applying a magnetizable ink to at least one selected area of a surface of the substrate;

applying a second substrate layer over said surface of said substrate over said magnetizable ink;

applying pressure to said substrate and said second substrate layer with said magnetizable ink between them and thereby compressing the substrate and second substrate layer with the magnetizable ink between them to a thickness such that the change in thickness at the edges of the magnetizable ink becomes imperceptible to an ordinary end user; and imparting a permanent magnetization to at least part of at least one said area of magnetizable ink.

23. A method according to claim 22, comprising imparting said permanent magnetization by subjecting said magnetizable ink to the magnetic field of an electric current.

24. A method according to claim 23, comprising wherein said electric current is caused to flow in parallel conductors.

25. A method according to claim 24, wherein said current is caused to flow in opposite directions in alternate conductors.

26. A method according to claim 24, wherein said parallel conductors comprise several straight conductors.

27. A method according to claim 26, wherein said straight, parallel conductors are evenly spaced.

28. A method according to claim 27, wherein the conductors are spaced apart by a distance of from approximately 0.5 mm to approximately 5 mm.

29. A method according to claim 24, wherein said parallel conductors form a substantially closed path.

30. A method according to claim 23, comprising wherein said current is caused to flow in at least one coil with its axis perpendicular to said surface of said substrate.

31. A method according to claim 1, wherein applying a magnetizable ink comprises applying a layer of magnetizable ink at least 80 μm thick.

32. A method according to claim 8, wherein applying a magnetizable ink comprises applying a layer of magnetizable ink at least 80 μm thick.

33. A method according to claim 1, wherein said magnetizable ink comprises particles with a particle size in the range of from 20 μm to 40 μm.

34. A method according to claim 33, wherein said particles are double scrubbed.

35. A method according to claim 8, wherein said magnetizable ink comprises particles with a particle size in the range of from 20 μm to 40 μm.

36. A method according to claim 35, wherein said particles are double scrubbed.

* * * * *